US007483978B2

(12) United States Patent
Esfahany et al.

(10) Patent No.: US 7,483,978 B2
(45) Date of Patent: Jan. 27, 2009

(54) PROVIDING A UNIFIED USER INTERFACE FOR MANAGING A PLURALITY OF HETEROGENEOUS COMPUTING ENVIRONMENTS

(75) Inventors: Kouros H. Esfahany, Huntington, NY (US); William E. Boyle, Bellport, NY (US)

(73) Assignee: Computer Associates Think, Inc., Islandia, NY (US)

( * ) Notice: Subject to any disclaimer, the term of this patent is extended or adjusted under 35 U.S.C. 154(b) by 238 days.

(21) Appl. No.: 11/435,347

(22) Filed: May 15, 2006

(65) Prior Publication Data

US 2007/0266136 A1 Nov. 15, 2007

(51) Int. Cl.
*G06F 15/173* (2006.01)
*G06F 12/00* (2006.01)
(52) U.S. Cl. ....................... 709/224; 719/316
(58) Field of Classification Search ................ 709/223, 709/224, 219, 249, 250; 719/316
See application file for complete search history.

(56) References Cited

U.S. PATENT DOCUMENTS

| 5,742,762 | A | * | 4/1998 | Scholl et al. ............... 709/200 |
| 5,870,559 | A | * | 2/1999 | Leshem et al. ............. 709/224 |
| 5,889,523 | A | | 3/1999 | Wilcox et al. .............. 345/357 |
| 6,115,646 | A | * | 9/2000 | Fiszman et al. ............ 700/181 |
| 6,122,664 | A | | 9/2000 | Boukobza et al. .......... 709/224 |
| 6,145,001 | A | * | 11/2000 | Scholl et al. ............... 709/223 |
| 6,178,529 | B1 | | 1/2001 | Short et al. .................. 714/51 |
| 6,226,273 | B1 | | 5/2001 | Busuioc et al. ............. 370/270 |
| 6,304,864 | B1 | | 10/2001 | Liddy et al. ................. 706/15 |
| 6,430,592 | B1 | | 8/2002 | Davison ..................... 709/103 |
| 6,530,840 | B1 | | 3/2003 | Cuomo et al. ................ 463/42 |

(Continued)

FOREIGN PATENT DOCUMENTS

WO       WO 01/38992 A2      5/2001

(Continued)

OTHER PUBLICATIONS

Jeannette Lawrence, Introduction to Neural Networks, 1994 California Scientific Software Press, 6th Edition, 18, 28 (4pgs.), 1994.

(Continued)

*Primary Examiner*—Zarni Maung
(74) *Attorney, Agent, or Firm*—Baker Botts L.L.P.

(57) ABSTRACT

In certain embodiments, a method for providing a unified user interface for managing a plurality of heterogeneous computing environments comprises displaying at least a portion of a framework user interface, the framework user interface comprising common functionality and a standard layout for the unified user interface. A listing of a subset of the heterogeneous computing environments may be displayed. Each of the heterogeneous computing environments may be modeled by one or more objects, each object corresponding to a particular computing environment. The method further includes, in response to an interaction request with respect to a particular computing environment, applying an appropriate plug-in, based on a mapping of the object that corresponds to the particular computing environment to the appropriate plug-in, to perform the requested interaction. Each plug-in may correspond to a type of computing environment and may be operable to facilitate display of information for managing a computing environment of the type corresponding to the plug-in.

49 Claims, 6 Drawing Sheets

U.S. PATENT DOCUMENTS

| | | | |
|---|---|---|---|
| 6,691,176 B1* | 2/2004 | Narin et al. | 719/318 |
| 6,848,104 B1 | 1/2005 | Van Ee et al. | 719/310 |
| 6,853,738 B1 | 2/2005 | Nishigaki et al. | 382/106 |
| 2001/0019332 A1* | 9/2001 | Fisher | 345/582 |
| 2001/0028729 A1 | 10/2001 | Nishigaki et al. | 382/104 |
| 2002/0091702 A1* | 7/2002 | Mullins | 707/100 |
| 2002/0184171 A1 | 12/2002 | McClanahan | 706/20 |
| 2003/0158884 A1 | 8/2003 | Alford, Jr. | 709/104 |
| 2003/0214525 A1 | 11/2003 | Esfahany | 345/700 |
| 2004/0221121 A1 | 11/2004 | Hamilton, II et al. | 711/170 |
| 2004/0250248 A1 | 12/2004 | Halpern et al. | 718/100 |
| 2005/0015661 A1 | 1/2005 | Vaidyanathan | 714/13 |
| 2005/0044301 A1 | 2/2005 | Vasilevsky et al. | 711/1 |
| 2005/0081201 A1 | 4/2005 | Aguilar, Jr. et al. | 718/100 |
| 2005/0120160 A1 | 6/2005 | Plouffe et al. | 711/1 |
| 2005/0131941 A1* | 6/2005 | Dettinger et al. | 707/104.1 |
| 2005/0132362 A1 | 6/2005 | Knauerhase et al. | 718/1 |
| 2005/0262504 A1 | 11/2005 | Esfahany et al. | 718/1 |
| 2005/0262505 A1 | 11/2005 | Esfahany et al. | 718/1 |
| 2005/0289145 A1* | 12/2005 | Voegel | 707/9 |
| 2007/0055647 A1* | 3/2007 | Mullins et al. | 707/2 |
| 2007/0079308 A1 | 4/2007 | Chiaramonte et al. | 718/1 |
| 2007/0094367 A1 | 4/2007 | Esfahany et al. | 709/223 |
| 2007/0266136 A1* | 11/2007 | Esfahany et al. | 709/223 |

FOREIGN PATENT DOCUMENTS

| | | |
|---|---|---|
| WO | WO 02/088938 A1 | 11/2002 |
| WO | WO 03/071424 | 8/2003 |
| WO | WO 03/088046 | 10/2003 |

OTHER PUBLICATIONS

Communication—Supplementary European Search Report in Application No. 02752185.5-1243, dated Apr. 27, 2007, received Jun. 19, 2007 (4 pgs.).

Omer F. Rana et al., "Resource Discovery for Dynamic Clusters in Computational Grids," XP-002429542, *IEEE*, 2001, 759-767 (9 pgs.).

PCT, Notification of Transmittal of the International Search Report and the Written Opinion of the International Searching Authority, or the Declaration, PCT/US2006/040918 (10 Pgs.), Date Mailed Jan. 31, 2007.

Platform Computing, Inc., "*An Introduction to Platform VM Orchestrator*. Extract More Value from a Virtual Server Environment Through Automated Management", XP002415478, (13 pgs.), Oct. 1, 2005.

Gamma, et al., "*Design Patterns Elements of Resusable Object-Oriented Software*", XP002261440, (24 pgs.), 1997.

VMware, Inc., "*VMware VirtualCenter User's Manual Version 1.0*", XP002407050, retrieved from the internet http://www.vmware.com/pdf/VirtualCenter_Users_Manual.pdf, retrieved on Aug. 16, 2005, (143 pgs.).

Govil, et al., "*Cellular Disco: Resource Management Using Virtual Clusters on Shared-Memory Multiprocessors*", Operating Systems Review, ACM, vol. 33, No. 5, pp. 154-169 (XP000919655), ACM 1-58113-140-2, Dec. 1999 (16 pgs.), Dec. 5, 2005.

Notification of Transmittal of the International Search Report and the Written Opinion of the International Searching Authority for International Application No. PCT/US2005/014269, filed Apr. 25, 2005 (12 pgs.), Nov. 16, 2005.

Notification of Transmittal of the International Search Report and the Written Opinion of the International Searching Authority, or the Declaration; International Application No. PCT/US2005/014270, (11 pgs), date mailed Aug. 8, 2005.

PCT, Notification of Transmittal of the International Search Report and the Written Opinion of the International Searching Authority, or the Declaration; International Appl. No. PCT/US2006/038055, (12 pgs), date mailed Feb. 1, 2007.

EPO Communication Pursuant to Article 96(2) EPC, Application No. 05 739 911.5-1243; Ref. HCD/J00049340EP, (6 pgs), Sep. 6, 2007.

Intel; White paper; Easy-attach Storage, making SAN Affordable (8 pgs), 2004.

White Paper; Building Virtual Infrastructure with VMware VirtualCenter; Vitual Infrastructure Software for the Responsive Enterprise; vmware, (10 pgs), 2004.

Computer Associates; Unicenter NSM Dynamic Reconfiguration Option; Complete Management Solution for High-End to Mid-Range Servers (24 pgs), 2003.

Computer Associates; Unicenter NSM Dynamic Reconfiguration Option; Complete Management Solution for High-End to Mid-Range Servers (updated Apr. 22, 2003) (28 pgs).

Computer Associates; Unicenter NSM Dynamic Reconfiguration Option; Getting Started Guide 3.0 (25 pgs), Apr. 2003.

Computer Associates; Unicenter NSM Dynamic Reconfiguration Option; Managing On-Demand Computing (59 pgs), Jun. 26, 2003.

Computer Associates; Unicenter Dynamic Reconfiguration Option; (1 pg), 2003.

Computer Associates; Unicenter NSM Dynamic Reconfiguration Option 3.0; High-End & Midframe Server Discovery, Monitoring & Administration Solution; CA Development Buddy Program (10 pgs), 2003.

Computer Associates; Managing Enterprise Clusters and Dynamic System Domains, Session Code: ENT07SN (47 pgs), 2003.

Managing Dynamic System Domains with Unicenter DRO (22 pgs), 2003.

Computer Associates; Unicenter Advanced Systems Management (UASM) r11 (47 pgs), 2005.

* cited by examiner

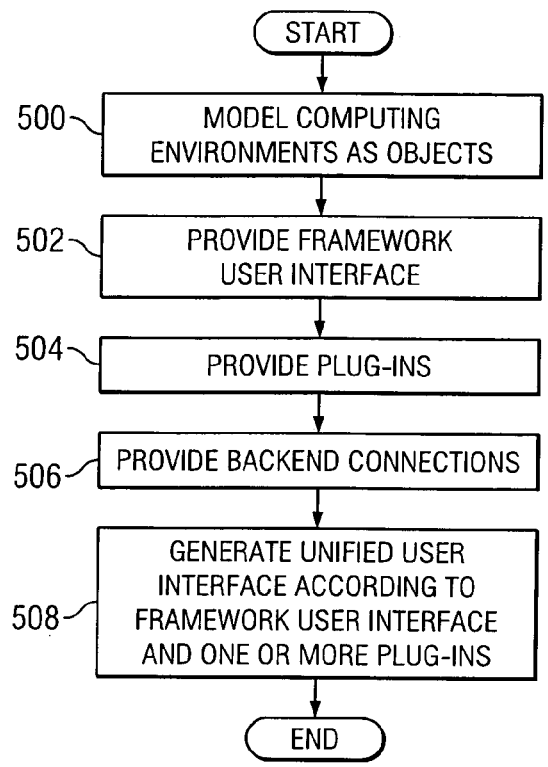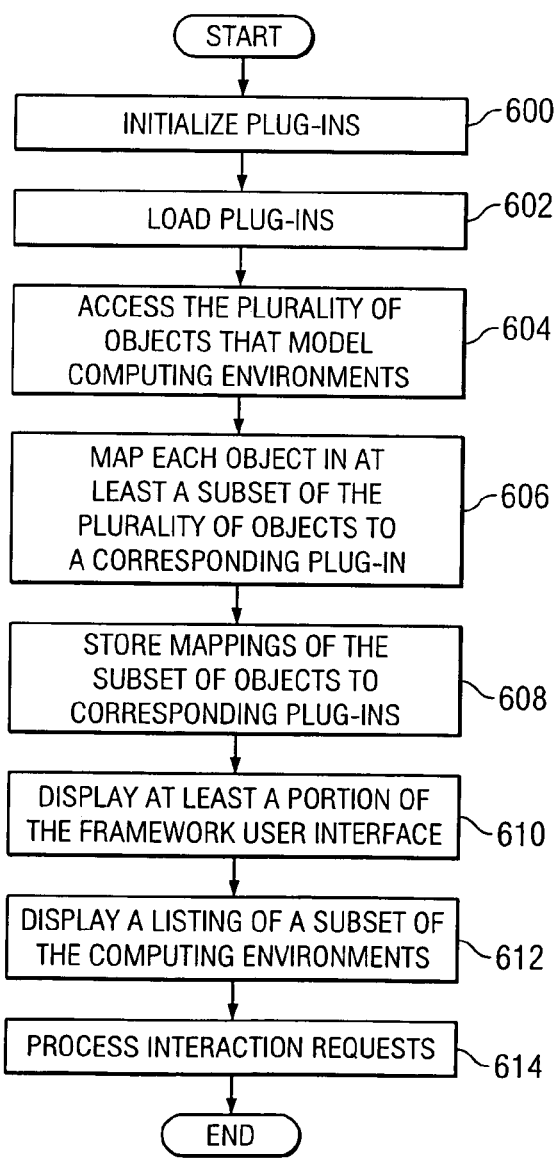

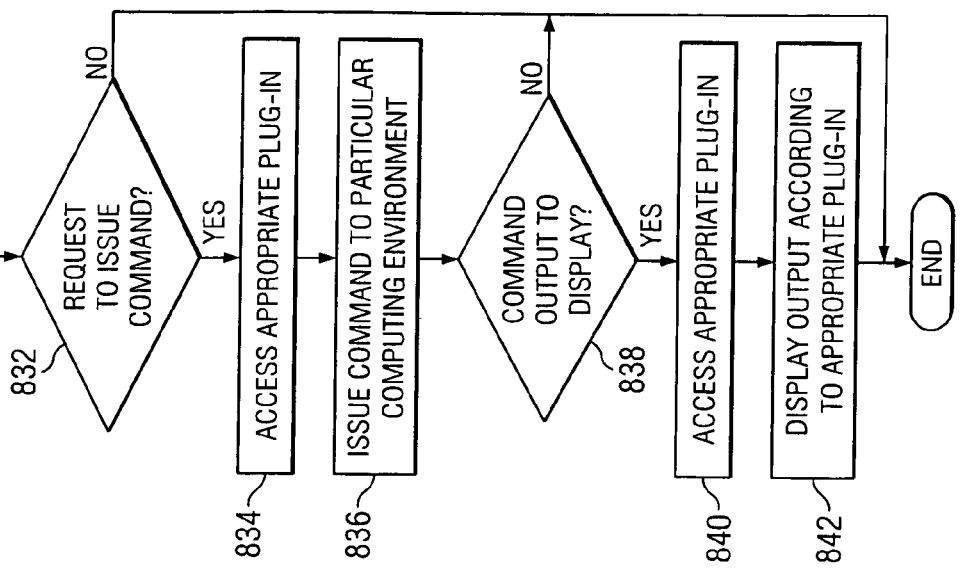
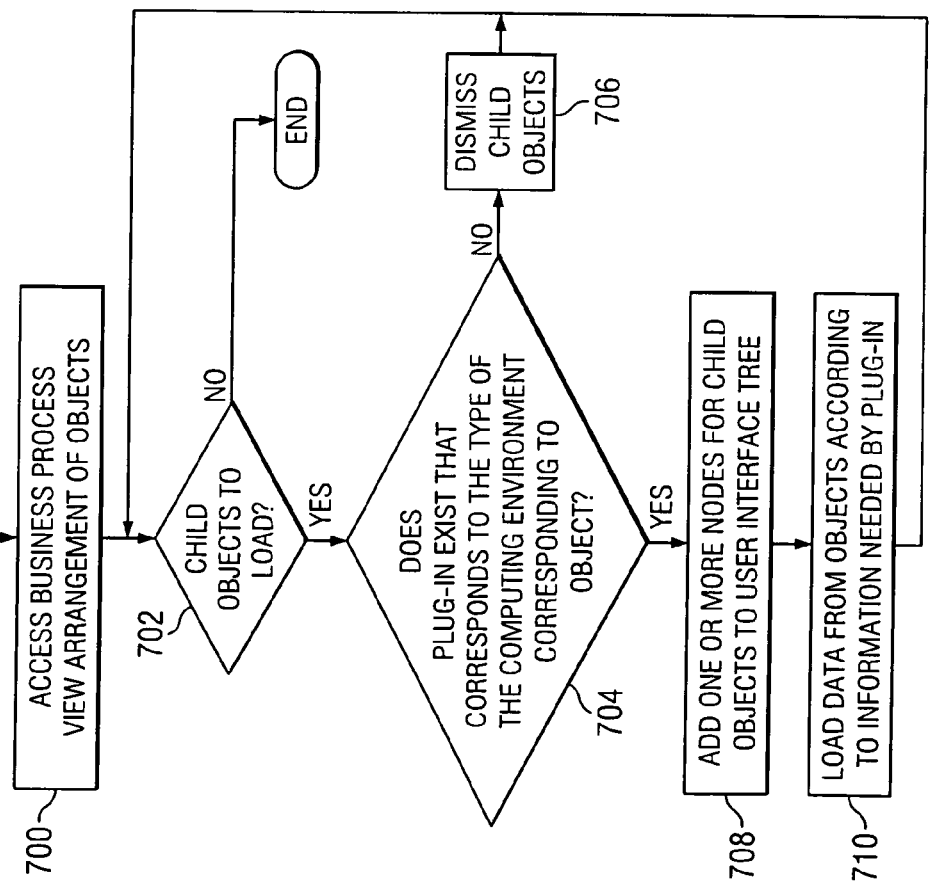

PROVIDING A UNIFIED USER INTERFACE FOR MANAGING A PLURALITY OF HETEROGENEOUS COMPUTING ENVIRONMENTS

TECHNICAL FIELD

The present invention relates generally to computer systems management and more particularly to providing a unified user interface for managing a plurality of heterogeneous computing environments.

BACKGROUND

Entities such as enterprises frequently operate using complex computing environments that need to be managed. Example computing environments include cluster environments, virtual environments, dynamic environments, and other suitable computing environments. Each of these types of computing environments is typically associated with its own management software. For example, cluster environments may be managed using management software for cluster environments, virtual environments may be managed using management software for virtual environments, and dynamic environments may be managed using management software for dynamic environments. For each type of computing environment (e.g., cluster environments, virtual environments, and dynamic environments), each vendor's implementation of that type of computing environment is typically associated with its own vendor-specific management software. For example, the cluster environments of an entity may each have their own vendor-specific management software, the virtual environments of an entity may each have their own vendor-specific management software, and the dynamic environments of an entity may each have their own vendor-specific management software.

Moreover, each management software instance may have its own unique user interface for managing its associated one or more computing environments. For example, the user interface for managing a cluster environment may differ from the user interface for managing a virtual environment, which may differ from the user interface for managing a dynamic environment. As another example, the user interface of a first vendor's management software for managing a cluster environment may differ from the user interface of a second vendor's management software for managing a cluster environment.

SUMMARY

According to the present invention, disadvantages and problems associated with previous techniques for computer systems management may be reduced or eliminated.

In certain embodiments, a method for providing a unified user interface for managing a plurality of heterogeneous computing environments comprises displaying at least a portion of a framework user interface, the framework user interface comprising common functionality and a standard layout for the unified user interface. A listing of a subset of the heterogeneous computing environments may be displayed. Each of the heterogeneous computing environments may be modeled by one or more objects, each object corresponding to a particular computing environment. The method further includes, in response to an interaction request with respect to a particular computing environment, applying an appropriate plug-in, based on a mapping of the object that corresponds to the particular computing environment to the appropriate plug-in, to perform the requested interaction. Each plug-in may correspond to a type of computing environment and may be operable to facilitate display of information for managing a computing environment of the type corresponding to the plug-in.

Particular embodiments of the present invention may provide one or more technical advantages. Certain embodiments of the present invention may provide a unified user interface for managing a plurality of heterogeneous computing environments, such as those from multiple vendors and/or of different types, in a substantially uniform manner. For example, the unified user interface provided by the present invention may provide the ability to manage the various computing environments of an enterprise or other entity through a common user interface, which may provide a single point of control for the multiple, heterogeneous computing environments of an enterprise or other entity. This single point of control may provide a common look and feel for managing the various computing environments. For example, the present invention may allow a user to view, manage, and administrate different computing environments across different platforms operating on different operating systems, using a single user interface that provides a common look and feel to the user.

In certain embodiments, the present invention provides a user such as a systems administrator with more control over the types of computing environments that the user can manage from a single interface. A developer, for example, may have the ability to add or remove plug-ins and to thereby change the scope of the computing environments that can be managed. In certain embodiments, a developer has the ability to provide updates and fixes to components in a plug-in format while keeping the framework user interface of the unified user interface untouched, which may decrease the time for integrating functionality into the unified user interface.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention, and for further features and advantages thereof, reference is now made to the following description, taken in conjunction with the accompanying drawings, in which:

FIG. 5 illustrates an example method for providing a unified user interface for managing a plurality of heterogeneous computing environments according to certain embodiments of the present invention;

FIG. 6 illustrates an example method for providing a unified user interface for managing a plurality of heterogeneous computing environments according to certain embodiments of the present invention;

FIG. 7 illustrates an example method for generating a user interface tree representation for generating unified user interface according to certain embodiments of the present invention; and FIGS. 8A-8B illustrate an example method for processing example user interactions with the unified user interface according to certain embodiments of the present invention.

DESCRIPTION OF EXAMPLE EMBODIMENTS

Figure 1:
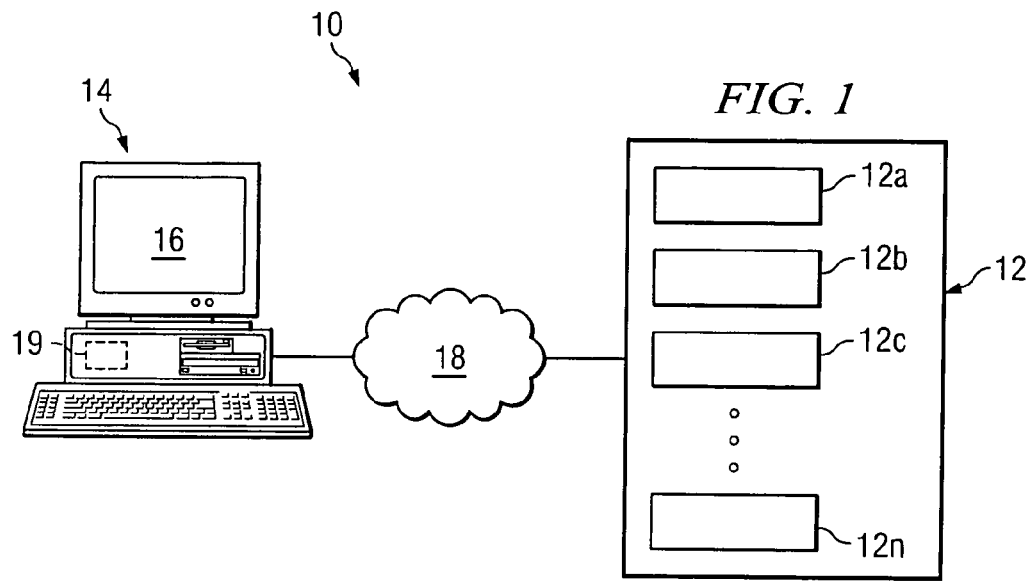
FIG. 1 illustrates an example system for providing a unified user interface for managing a plurality of heterogeneous computing environments according to certain embodiments of the present invention.

FIG. 1 illustrates an example system 10 for providing a unified user interface for managing a plurality of heterogeneous computing environments 12 according to certain embodiments of the present invention. System 10 includes multiple computing environments 12 and a management computer system 14. In general, system 10 is operable to provide a unified user interface 16 that may be used to manage the heterogeneous computing environments 12 of an entity. In certain embodiments, unified user interface 16 comprises what may be described as an object-based pluggable management user interface. Although this particular implementation of system 10 is illustrated and primarily described, this is for exemplary purposes only, and the present invention contemplates any suitable implementation of system 10.

Computing environments 12 may be heterogeneous. For example, computing environments 12 may include different types of computing environments and be provided by a variety of vendors. In certain embodiments, computing environments 12 may include one or more of the following types of computing environments: one or more cluster environments; one or more dynamic environments; and one or more virtual environments. Cluster environments, dynamic environments, and virtual environments are described in more detail below. The present invention contemplates system 10 including any suitable number of computing environments 12, according to particular needs. Although cluster environments, dynamic environments, and virtual environments are primarily described, the present invention contemplates computing environments 12 including any suitable types of computing environments according to particular needs. Computing environments 12 may exist entirely within a single entity, such as a business enterprise, or may span multiple entities.

Management computer system 14 may comprise one or more computer systems operable to facilitate management of computing environments 12. In a particular embodiment, management computer system 14 comprises one or more computers that may be used by a network manager or other information technology personnel. Management computer system 14 may include any suitable combination of firmware, software, or hardware for managing computing environments 12. The present invention contemplates system 10 including any suitable number of management computer systems 14, according to particular needs.

Computing environments 12 and management computer system 14 may each include one or more computer systems at one or more locations and may share data storage, communications, or other resources according to particular needs. For example, functionality described in connection with management computer system 14 may be provided using a single or multiple computer systems, which in a particular embodiment might include a conventional desktop or laptop computer or a server or server pool. Each computer system may include one or more suitable input devices, output devices, mass storage media, processors, memory, interfaces, communication ports, or other appropriate components for receiving, processing, storing, and communicating information according to the operation of system 10.

The one or more processors of each computer system may be a microprocessor, controller, or any other suitable computing device or resource. The one or more processors may work, either alone or with other components of system 10, to provide the functionality of system 10 described herein. Additionally, each computer system may include a personal computer, workstation, network computer, kiosk, wireless data port, personal data assistant (PDA), a client-server environment, one or more processors within these or other devices, or any other suitable processing device. As used throughout this description, the term "computer" is intended to encompass a personal computer, workstation, network computer, or any other suitable processing device.

Management computer system 14 may be coupled to computing environments 12 via a network 18. Network 18 facilitates wireless or wireline communication. Network 18 may communicate, for example, Internet Protocol (IP) packets, Frame Relay frames, Asynchronous Transfer Mode (ATM) cells, voice, video, data, and other suitable information between network addresses. Network 18 may include one or more local area networks (LANs), radio access networks (RANs), metropolitan area networks (MANs), wide area networks (WANs), all or a portion of the global computer network known as the Internet, and/or any other communication system or systems at one or more locations.

It is often desirable to manage computing environments 12, using management computer system 14 for example. Management software may enable a user such as a systems administrator to manage computing environments 12. System 10 is operable to generate unified user interface 16 that may be used to manage the plurality of heterogeneous computing environments 12. In certain embodiments, unified user interface 16 may be used to manage computing environments 12 of different types and from different vendors. As used in this description, managing computing environments 12 may include one or more of viewing information regarding computing environments 12, discovering computing environments 12, monitoring computing environments 12, controlling computing environments 12, or any other suitable activity for managing computing environments 12.

Management computer system 14 may include a user interface-generating module 19. User interface-generating module 19 is operable to facilitate generation of unified user interface 16. User interface-generating module 19 may include any suitable combination of hardware, firmware, or software. In certain embodiments, user interface-generating module 19 is part of a larger management program for managing components of system 10, such as computing environments 12. Management computer system 14 may interact with computing environments 12 according to suitable input from any number of associated users. Throughout this description, "management computer system 14" and "user of management computer system 14" may be used interchangeably.

Unified user interface 16 may include any suitable combination of a graphical user interface (GUI), a web-based user interface, and any other suitable types of user interfaces. Throughout this description, use of the term "unified" to describe user interface 16 is meant to describe a user interface that provides a common look and feel for managing the plurality of heterogeneous computing environments 12.

As described briefly above, in certain embodiments, computing environments 12 may include one or more cluster environments, one or more virtual environments, and one or more dynamic environments. Although system 10 is described as including each of these types of computing environments 12, the present invention contemplates system 10 including only certain of these types (or completely different types) of computing environments 12. Moreover, system 10 may include multiple instances of each type of computing environment 12, and the instances of a type of computing environment 12 may be supported by a different vendor. For example, computing environments 12 may include multiple virtual environments, at least two of which are supported by a different vendor. A brief description of these three types of example computing environments 12 follows.

In certain embodiments, a cluster environment includes one or more clusters that each includes two or more computer systems organized to work together to provide increased availability, reliability, and scalability than can be obtained by using a single system. For example, clustering may be achieved by sharing one or more storage devices or other memory modules. In certain embodiments, a cluster includes a group of independent computer components coupled by a suitable combination of software, hardware, and firmware that facilitates the components working together as a single system. Clusters may facilitate maintaining highly available applications and performance of failover processing through migration within a cluster.

Clusters may interact with cluster resources. Cluster resources may include, for example, a collection of shared resources, such as Internet Protocol (IP) addresses; disk volumes, and applications. Cluster resources may be scaleable and shared, and may facilitate providing dynamic ownership. A cluster package may include a collection of cluster resources bundled to provide highly available services that facilitate a designated usage of cluster resources. A cluster package is typically scaleable and highly available with a dynamic location. Example vendor-specific cluster environments may include MICROSOFT CS, REDHAT AS 3.0, SUN, VERITAS, HEWLETT-PACKARD, AIX, or any other suitable type of cluster.

The present invention may provide one or more benefits for managing cluster environments. For example, the present invention may provide a centralized, substantially uniform interface for managing one or more clusters. The present invention may treat clusters as independent entities. In certain embodiments, the present invention may normalize cluster monitoring and management functions through the common user interface provided by user interface 16. The present invention may provide for secure management of clusters. In certain embodiments, the present invention may simplify the complexities of the clusters and reduce the learning curve for managing the clusters.

In certain embodiments, the present invention may facilitate automatic, real-time status/health monitoring of nodes, packages and resource groups, and individual resources of clusters. In certain embodiments, the present invention integrates clusters with LAN/WAN objects, which may create a unified enterprise management console (e.g., through user interface 16). In certain embodiments, the present invention may utilize one or more data collectors to identify various clusters and to collect data from each cluster. The present invention may use one or more vendor-specific data collectors. For example, the present invention may use data collectors for one or more of the following cluster environments: MICROSOFT CS, REDHAT AS 3.0, SUN, VERITAS, HEWLETT-PACKARD, AIX, or any other suitable type of cluster.

In certain embodiments, the present invention provides for managing one or more of the following attributes of each cluster environment: (1) average time a cluster spends in an up/down state; (2) average time a cluster node spends in an up/down state; (3) average time a resource group spends in an up/down state; (4) average time a resource spends in an up/down state; (5) percentage uptime for all cluster entities; and (6) any other suitable attributes of a cluster environment. The present invention may facilitate management of cluster nodes by facilitating monitoring of CPU and memory utilization on each cluster node. In certain embodiments, the present invention may provide the ability to configure monitoring and the level of alert to raise when utilization crosses a particular threshold.

In certain embodiments, a virtual environment includes a suitable combination of hardware, software, and firmware that enables an entity to create and run multiple virtual computing modules (e.g., virtual machines) on a single physical server, which may provide flexibility to the entity. Example vendor-specific virtual environments may include, but are not limited to, VMWARE, MICROSOFT VIRTUAL SERVER, XEN, or any other suitable virtual environment solutions. Each virtual environment may include one or more virtual servers.

Typically, a virtual server is a server operable to run multiple virtual computing modules (e.g., virtual machines) on a single physical server, which may provide flexibility to an entity. Each virtual server may include one or more resources. Virtual server resources may include any suitable combination of hardware, software, and firmware that a virtual server uses to function. For example, the resources of a virtual server may include one or more central processing units (CPUs), one or more memory units, and any other suitable resources according to particular needs. Each virtual server resource may have one or more attributes that may be managed. An attribute of a virtual server may include a measurable quantity of a virtual server. For example, an attribute of a memory unit may include the percentage of memory available for use or the percentage of memory being used. As another example, an attribute of a CPU may include CPU usage. Although attributes of virtual server resources are primarily described, the present invention contemplates virtual servers including any suitable attributes, according to particular needs.

Each virtual server may host one or more virtual machines. In certain embodiments, a virtual machine is a logical entity that couples memory, processors, and hardware (e.g., network and disk) resources in order to simulate a functioning computing module. A virtual machine may be capable of running any suitable operating system, such as any suitable INTEL-based operating system (e.g., LINUX or MICROSOFT WINDOWS). Multiple virtual machines may operate concurrently on a virtual server. In certain embodiments, each virtual machine associated with a virtual server may be thought of as a computer that operates within a virtual server as an entity separate from other virtual machines of that virtual server. Each virtual machine of a virtual server may be configured according to any suitable parameters and in any suitable manner according to particular needs. Virtual machines, which may also be referred to as virtual sessions or virtual machine sessions, are typically dynamic, meaning that virtual machines may be added or removed from a virtual server.

Each virtual machine may be associated with one or more resources. Virtual machine resources may include any suitable combination of hardware, software, and firmware that a virtual machine uses to function. For example, the resources of a virtual machine may include one or more CPUs, one or more power units, one or more memory units, one or more network resources, one or more disk resources, or any other suitable resources according to particular needs. Each virtual machine resource may have one or more attributes that may be managed. An attribute of a virtual machine may include a measurable quantity of a virtual machine. For example, an attribute of a memory unit may include the percentage of memory available for use or the percentage of memory being used. Another example attribute of a virtual machine may include a heartbeat of the machine, indicating the hertz rating of the virtual machine. Although attributes of virtual machine resources are primarily described, the present invention contemplates virtual machines including any suitable attributes, according to particular needs. Configuring a virtual machine may include configuring one or more resources of the virtual machine.

The present invention may provide one or more benefits for managing virtual environments. For example, the present invention may provide a single, comprehensive management user interface for managing virtual environments of an entity. As another example, the present invention may provide secure, centralized, and role-based management, which may reduce costs and improve efficiency in managing virtual environments. As another example, the present invention may facilitate management of virtual environments according to business-driven service levels. As another example, the present invention may support a variety of virtual environment platforms.

In certain embodiments, the present invention provides for managing (e.g., monitoring and/or controlling) one or more of the following attributes of each virtual environment: (1) CPU usage (e.g., as a percentage); (2) memory usage (e.g., in kilobytes); (3) network bytes received per second; (4) network bytes sent per second; (5) virtual disk bytes read per second; (6) virtual disk bytes written per second; (7) heartbeat; (8) system uptime; and (9) any other suitable attributes of a dynamic virtual environment 12b. The present invention may facilitate management of virtual environment hardware, such as one or more disks and one or more networks of a virtual server or virtual machines. For example, the present invention may facilitate monitoring disk input and output and adaptor input and output, and may be able to determine state based on kilobytes read and kilobytes written. As another example, the present invention may provide the ability to configure monitoring, such as by configuring the level of alert to raise when there is a loss of input/output.

In certain embodiments, a dynamic environment, which may also be referred to as "on-demand computing" or "utility computing," allows computing resources to be made available to a user as needed, which may allow an entity to meet efficiently fluctuating demands for computing resources. Typically, the resources are maintained by the entity; however, the present invention contemplates the resources being maintained by a third party (e.g., a service provider). For example, a server in a dynamic environment may include x number of CPUs and y gigabytes of memory. A dynamic environment may allow the CPUs and memory units to be partitioned on a dynamic basis. In certain embodiments, each partition operates independently, can be rebooted independently of other partitions, can include a different operating system than other partitions, and can include different applications than other partitions.

An entity's demand on computing resources may vary drastically from time-to-time. Thus, maintaining sufficient computing resources to meet peak requirements may be costly. On the other hand, if an entity attempts to cut costs by maintaining only minimal computing resources, there may not be sufficient resources to meet peak requirements. Dynamic environments may help solve one or more of these problems. Example vendor-specific dynamic environments may include VMWARE ESX, IBM PSERIES LPAR (logical partitioning), SUN MICROSYSTEMS SUNFIRE MID- AND HIGH-END SYSTEM, or any other suitable type of dynamic environment.

The present invention may provide one or more benefits for managing dynamic environments. For example, the present invention may provide real-time discovery of dynamic environments. In certain embodiments, the present invention discovers and represents logical and virtualized host machines in a single user interface. As another example, the present invention may provide for centralized administration of dynamic environments, which may include a central management interface (e.g., user interface 16) for monitoring and managing dynamic environments. As another example, the present invention may provide for secure, role-based management of dynamic environments, which may include access control and assigned administrative privileges. As another example, the present invention may facilitate dynamic reconfiguration by continuously or at another suitable interval balancing system utilization by allocating or de-allocating resources. As another example, the present invention may support a variety of dynamic environment platforms.

In certain embodiments, the present invention provides for managing (e.g., monitoring and/or controlling) one or more of the following attributes of each dynamic environment: (1) CPU usage (e.g., as a percentage); (2) memory usage (e.g., as a percentage); (3) number of CPUs; (4) number of memory blocks; (5) load average; (6) total platform CPU usage; (7) total platform memory usage; and (8) any other suitable attributes of a dynamic environment.

As described above, system 10 is operable to provide unified user interface 16 for managing computing environments 12. Unified user interface 16 may be thought of as the command center through which a user can manage the plurality of heterogeneous computing environments 12. In certain embodiments, unified user interface 16 simplifies viewing representations of computing environments 12, such as a listing of the computing environments 12 of an entity (and the components of the computing environments 12, if appropriate). In certain embodiments, unified user interface 16 is operable to display computing environment data regarding one or more computing environments 12. The computing environment data for a particular computing environment 12 may include any suitable information for managing the particular computing environment 12, such as status information regarding the particular computing environment 12 or one or more components of the particular computing environment 12, various values and measurements regarding the particular computing environment 12 or one or more components of the particular computing environment 12, or any other suitable attributes regarding the particular computing environment 12 or one or more components of the particular computing environment 12.

In certain embodiments, unified user interface 16 is operable to enable a user of management computer system 14 to issue one or more commands to computing environments 12, which may allow the user to control computing environments 12. These commands may be issued on-the-fly or scheduled (e.g., using a task scheduler) using user interface 16. A task scheduler may allow a user to schedule commands to be issued at a certain time or date. For example, the task scheduler may provide users with the ability to schedule maintenance, planned failovers in clusters, long running tasks (e.g., virtual machine cloning), and any other suitable tasks. In certain embodiments, unified user interface 16 is operable to display output resulting from the execution of one or more commands.

In certain embodiments, management of computing environments 12 using user interface 16 may be role-based. For example, a suitable component of system 10 may provide the ability to create roles for users of manager computer system 14. Such roles may be used to define the particular management operations available to users of computer system 14. The management operations allowed by a particular role may be defined by one or more rules. In certain embodiments, the rules specify which operations a user is allowed to perform, what information the user is allowed to view, and what computing environments 12 a user can manage. The rules may include any suitable rules, according to particular needs. For example, a particular role may allow a user to view the status of one or more computing environments 12 without allowing the user to affect the state of or otherwise control the one or more virtual environments 12. As another example, a particular role may allow a user to view and control only one particular computing environment 12. New roles may be created, along with a set of rules for those roles. As another example, a particular role, such as an administrative role, may allow a user to view and control any computing environment 12. Users may be required to enter a password or provide other authentication information to access the system and perform the operations allowed by their assigned role.

Figure 2:
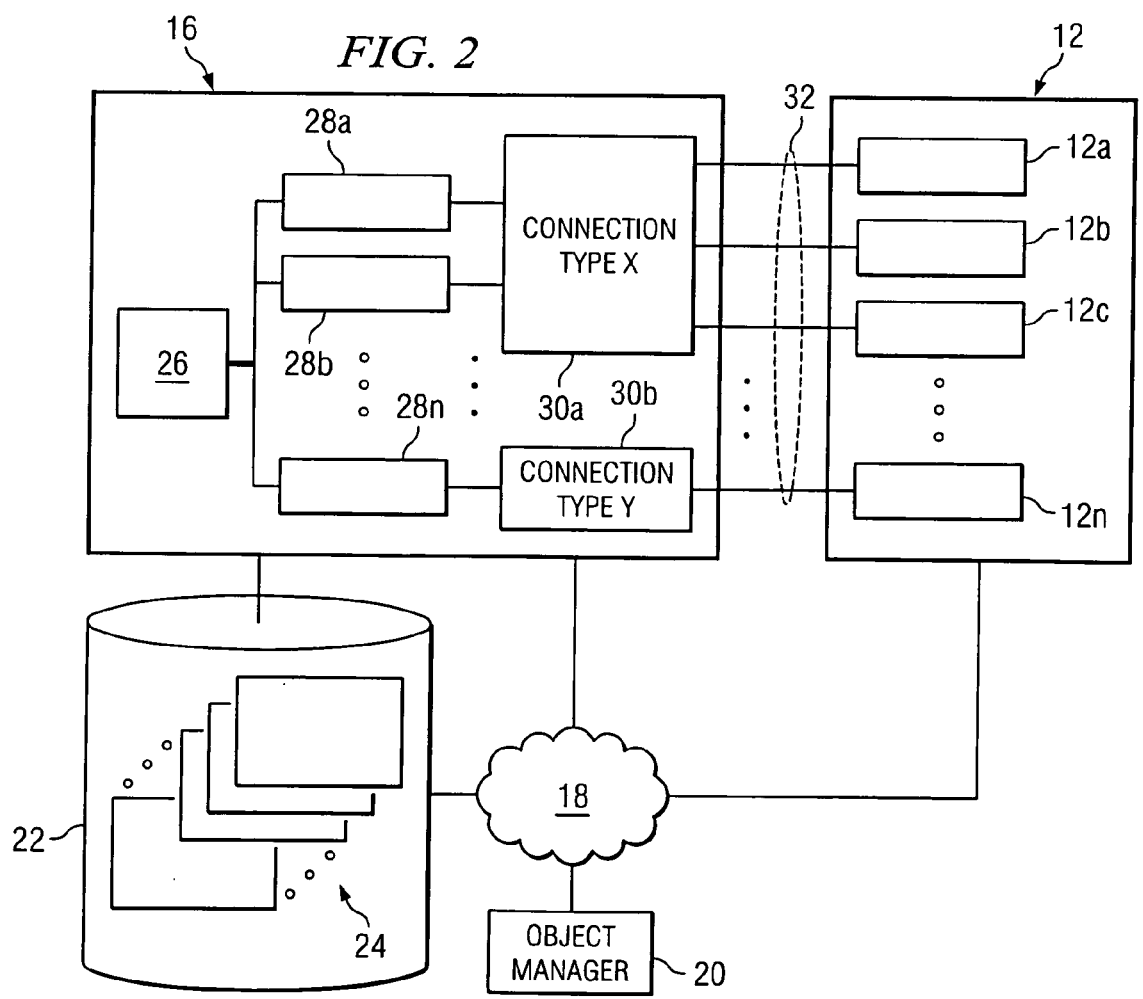
FIG. 2 illustrates in more detail certain aspects of an example system for providing a unified user interface for managing a plurality of heterogeneous computing environments according to certain embodiments of the present invention.

FIG. 2 illustrates in more detail certain aspects of example system 10 for providing unified user interface 16 for managing the plurality of heterogeneous computing environments 12, according to certain embodiments of the present invention. Although this particular implementation of system 10 is illustrated and primarily described, this is for exemplary purposes only, and the present invention contemplates any suitable implementation of system 10.

System 10 may include an object manager 20 that is operable to model computing environments 12 as objects. Object manager 20 may store the objects in a memory module 22 as objects 24. For example, memory module 22 may store one or more objects 24 that model each cluster environment, one or more objects 24 that model each virtual environment, and one or more objects 24 that model each dynamic environment. Although particular techniques for modeling computing environments 12 as objects 24 are described, the present invention contemplates modeling computing environments 12 as objects 24 in any suitable manner according to particular needs.

An "object" may be, for example, a self-contained entity that may include both data and methods to manipulate the data. The data of an object 24 may be exposed or made accessible via an interface of methods. Objects 24 may facilitate abstracting logical and physical entities in software and hiding the information and details of an abstraction inside an object 24 while exposing a world view via an interface. Modeling computing environments 12 as objects 24 may provide a normalized set of management operations for managing computing environments 12. Modeling computing environments 12 as objects 24 may simplify management of computing environments 12 and facilitate substantially simultaneous management of more than one heterogeneous computing environment 12 by overcoming interoperability problems. In certain embodiments, modeling a computing environment 12 as one or more objects 24 includes modeling one or more of the components of the computing environment 12 as objects 24.

One or more objects 24 may be generated, for each of the plurality of heterogeneous computing environments 12, to model computing environments 12 and to abstract the vendor-specific management operations of computing environments 12 to a normalized set of management operations. For example, a first object 24 may model a particular computing environment 12, while one or more additional objects 24 may model the various components of the particular computing environment 12. The one or more objects 24 that model a particular computing environment 12 (and possibly the one or more components of the particular computing environment 12) may be said to correspond to the particular computing environment 12.

Various entities such as programmers, processes, enterprise management applications, and network managers may desire to interact with computing environments 12, and a system for managing heterogeneous computing environments 12 may benefit from the ability to manage heterogeneous computing environments 12 through a normalized set of management operations. Thus, in certain embodiments, when a vendor of a computing environment implements the back-end of a set of management operations (e.g., vendor-specific management operations), the applications, programmers, and processes may interact with the front-end of the set of management operations (e.g., normalized management operations) provided by objects 24. The normalized management operations may be implemented in any suitable combination of data and methods of the generated objects 24.

Object manager 20 may be operable to facilitate discovery of computing environments 12 and their components, and to generate objects 24 that model discovered computing environments 12 and components of computing environments 12. For example, object manager 20 may discover computing environments 12 and generate, for each of computing environments 12, one or more objects 24 that model that computing environment 12. As a particular example, object manager 20 may discover a cluster environment and generate one or more objects 24 that model the cluster environment. As another example, object manager 20 may discover a virtual environment and generate one or more objects 24 that model the virtual environment. As another example, object manager 20 may discover a dynamic environment and generate one or more objects 24 that model the dynamic environment. In certain embodiments, object manager 20 is operable to discover a particular computing environment 12 by discovering one or more components of the particular computing environment 12.

Object manager 20 may be operable to receive and analyze data regarding computing environments 12. For example, object manager 20 may discover computing environments 12 by receiving and analyzing existence data regarding computing environments 12. Existence data may include information regarding the presence of one or more computing environments 12, including the components of the one or more computing environments 12. Existence data may include any other suitable information, according to particular needs.

In certain embodiments, generating one or more objects 24 that model a computing environment 12 includes storing one or more values in the one or more generated objects 24. Objects 24 may be arranged in a hierarchy according to a predefined classification system. The hierarchy may facilitate inheritance and other object-oriented programming techniques, and may facilitate accessing objects 24 individually and/or collectively. For example, organizing objects 24 in the hierarchy may simplify interacting with parent objects 24 and objects 24 that derive from these parent objects 24. Throughout the remainder of this description, the hierarchical arrangement of objects 24 in memory module 22 will be referred to as the business process view; however, it should be understood that the present invention contemplates any suitable hierarchical arrangement of objects 24 (or none at all), according to particular needs. The business process view may include a root node that forms the foundation of the hierarchy. In certain embodiments, in response to receiving existence data for a computing environment 12, object manager 20 may access the business process view of objects 24 to determine the appropriate one or more objects 24 to generate based on the existence data received, and generate the one or more appropriate objects 24.

An object 24 may include or otherwise be associated with type information that may be used to identify and classify the computing environment 12 that corresponds to the object 24. For example, an object 24 may include business process view class information, platform class information, or any other suitable information for identifying and classifying the computer system 12 modeled by the object 24. Business process view class information may identify the position of object 24 within the business process view. Platform class information may include information that identifies the type of computing environment modeled by the object 24.

In certain embodiments, object manager 20 is operable to facilitate monitoring of the computing environments 12 that are modeled as objects 24. For example, object manager 20 may receive and analyze computing environment data regarding computing environments 12 that are modeled by objects 24. Computing environment data may include information regarding the status of the components of a computing environment 12, the attributes of the components of a computing environment 12, the configuration of a computing environment 12, or any other suitable information regarding the performance of a computing environment 12 according to particular needs.

Computing environment data may be used for monitoring computing environments 12. Object manager 20 may store this received computing environment data in memory module 22. For example, object manager 20 may determine the appropriate one or more objects 24 to which the received computing environment data corresponds and store that information in the one or more appropriate objects 24 stored in memory module 22. In certain embodiments, object manager 20 may receive computing environment data regarding a particular computing environment 12, analyze the computing environment data to determine the appropriate one or more objects 24 that model the particular computing environment 12 that corresponds to the received computing environment data, and update, based on the received computing environment data, one or more values of the one or more appropriate objects 24 that model the computing environment 12. In certain embodiments, updating the one or more values includes invoking one or more methods of the one or more appropriate objects 24 that model the particular computing environment 12.

Object manager 20 may discover and monitor computing environments 12 in any suitable manner, according to particular needs. For example, object manager 20 may receive existence data and computing environment data in any suitable manner, according to particular needs. In certain embodiments, system 10 includes one or more data collectors operable to gather data regarding computing environments 12, such as computing environment data regarding the components of computing environments 12, and communicate the gathered data to object manager 20. The data gathered by the data collectors may include existence data (e.g., for discovering computing environments 12) and computing environment data (e.g., for monitoring computing environments 12). Data collectors may identify computing environments 12 (e.g., including components of computing environments 12) and transmit data concerning the computing environments 12 (e.g., existence data and computing environment data) to object manager 20.

Data collectors may, for example, detect the presence of the components of computing environments 12, communicate existence data to object manager 20, monitor computing environments 12 to gather computing environment data regarding the components of the computing environments 12 that are represented as objects 24, communicate computing environment data to object manager 20, and perform other suitable functions according to particular needs. Data collectors may be implemented in any suitable combination of software, firmware, and hardware. As an example, data collectors may be intelligent, automated data gatherers. In certain embodiments, data collectors may be agents of object manager 20 (e.g., neural network agents).

Object manager 20 may include any suitable combination of software, firmware, and hardware. Memory module 22 may include any memory or database module and may take the form of volatile or non-volatile memory including, without limitation, magnetic media, optical media, random access memory (RAM), read-only memory (ROM), removable media, or any other suitable local or memory component. In particular embodiments, memory module 22 includes one or more SQL servers. Although a single memory module 22 is illustrated, the present invention contemplates system 10 including any suitable number of memory modules 22 according to particular needs. Each of object manager 20 and memory module 22 may be integral to or external from management computer system 14 or any other suitable components of system 10. For example, each of object manager 20 and memory module 22 may be integral to management computer system 14 or may communicate with management computer system 14 via network 18.

As described above, unified user interface 16 is operable to provide the display with which a user interacts to manage the plurality of heterogeneous computing environments 12. User interface 16 may be displayed on a computer monitor or other suitable display device of management computer system 14.

In certain embodiments, unified user interface 16 may be designed and implemented using the JAVA programming language. Using JAVA to implement user interface 16 may be desirable because JAVA is platform independent. Additionally, JAVA is conducive to object-oriented programming. Moreover, JAVA may allow for the use of SWING and/or the abstract window toolkit (AWT). SWING is a GUI component kit for building user interfaces and handling end user input. SWING supports pluggable look and feel and accessibility features. Use of JAVA may also allow for the use of the AWT to render user interface 16 and provide flexibility to implement custom components and dynamically load those components. AWT is a package of classes for creating components such as buttons, menus, and scrollbars for applets and standalone applications. AWT provides a standard application program interface (API) for building GUIs for JAVA programs. Although implementation of unified user interface 16 using JAVA is primarily described, the present invention contemplates implementing user interface 16 using any suitable programming language, according to particular needs.

In certain embodiments, user interface 16 includes or is otherwise generated using a framework user interface 26 and one or more plug-ins 28. Additionally, in certain embodiments, user interface 16 includes or is otherwise generated using one or more backend connections 30. Each of these components for generating unified user interface 16 is described in more detail below.

Framework user interface 26 comprises the foundation for generating unified user interface 16. Framework user interface 26 may be thought of as the skeleton on which unified user interface 16 is built, providing the basic look and feel of user interface 16 and certain functions and attributes that are not specific to any particular computing environment 12. Framework user interface 16 be implemented in any suitable combination of software, firmware, and hardware.

Framework user interface 26 may comprise a standard layout for generating unified user interface 16. In certain embodiments, the standard layout includes one or more panels, one or more toolbars, one or more menus, various icons, one or more graphical representations, and any other suitable elements for a user interface. For example, the standard layout may include a first panel that displays icons and graphical representations for computing enviromnents 12 and that may allow a user to browse a list of computing environments 12 (and components of computing environments 12) that are modeled as objects 24 and that have a corresponding plug-in 28. In certain embodiments, the list of computing environments 12 may be arranged in a hierarchical manner (e.g., based on the business process view of objects 24), which may be referred to as a view tree. As described in more detail below, the view tree may be generated from a cache tree. The view tree and cache tree may be a part of a tree representation of at least a subset of objects 24, the subset including those objects 24 that correspond to a computing environment 12 that has a corresponding plug-in 28, and may include a mapping of each object 24 to the plug-in 24 that corresponds to the computing environment that corresponds to the object 24. Representations of the computing environments 12 (and components of computing environments 12) that are modeled by these objects 24 may be displayed in the view tree.

The standard layout may include one or more panels that allow specific data, properties, graphs, or other computing environment data about computing environments 12 to be displayed. For example, specific data, properties, graphs, or other computing environment data about computing environments 12 obtained using plug-ins 28 may be displayed in the one or more panels. The standard layout may include one or more panels that are operable to display output after command execution. For example, using unified user interface 16, a user may issue a command for a particular computing environment 12, and the output of the command after execution by the particular computing environment 12 may be displayed in one or more panels of the standard layout. In certain embodiments, the standard layout may include one or more toolbars and one or more menus, which may present a user with a familiar look and feel by using a set of standard menus and toolbars that resemble those of a typical user interface.

Framework user interface 26 may comprise a set of common functionality for managing each of computing environments 12. For example, framework user interface 26 may provide key functionality to plug-ins 28 (described in more detail below), while separating the most commonly used functionality of the heterogeneous computing environments 12 from the specifics of each plug-in 28 and\or connection 30. As non-limiting examples, this common set of functionality may include management functions that are common to a group of computing environments 12, management functions that are not specific to any particular computing environment 12, functions for manipulating the display of unified user interface 16, or any other suitable functions. In certain embodiments, the common functionality of framework user interface 26 comprises common functionality of the plurality of heterogeneous computing environments 12 that has been abstracted for application to each of computing environments 12.

Plug-ins 28 may provide functionality and display elements that are specific to a particular type of computing environment 12. This environment-specific functionality may enhance the standard layout and set of common functionality provided by framework user interface 26. Each plug-in 28 may correspond to a particular type of computing environment 12 (e.g., cluster environment, virtual environment, or dynamic environment), with a particular vendor implementation of a particular type of computing environment 12, or with a particular instance of a vendor implementation of a particular type of computing environment 12. For purposes of this description, reference to a plug-in 28 corresponding to a particular type of computing environment 12 is meant to include any of these variations. In certain embodiments, a plug-in 28 is operable to facilitate the display of information for managing a computing environment 12 that is of the type of computing environment 12 that corresponds to the plug-in 28.

Unified user interface 16 may be generated, in part, using a set of interfaces that are implemented within plug-ins 28. Each plug-in 28 may specify rules, properties, and other suitable information for possible displays and commands associated with the computing environment 12 that corresponds to the plug-in 28. For example, each plug-in 28 may include a collection of properties, graphs, icons, menus, or any other appropriate items that may be displayed. Plug-ins 28 may allow user interface 16 to render information queried from memory 22 (e.g., from objects 24) and to display that information with the relevant component, property panel, graphs, icons, or menus for example. In addition, plug-ins 28 may make available commands that can be executed on the various computing environments 12. For example, the plug-in 28 for a particular computing environment 12 may make available commands that can be executed on that particular computing environment 12.

In certain embodiments, each plug-in 28 may include definitions of certain object properties and rules, which may facilitate identification of appropriate menu command listings for user interface 16. In certain embodiments, each plug-in 28 may include one or more localized properties files. Localization refers to the process of establishing information within a computer system specific to the operation of particular native languages, local customs, and coded character sets. The one or more localization files of a plug-in 28 may be used to represent text in a particular country's character set, for example. In certain embodiments, each plug-in 28 includes information regarding one or more backend connection types that may be used for the plug-in 28.

In certain embodiments, each plug-in 28 comprises multiple files compressed and packaged into a separate file. For example, in a JAVA implementation the multiple files of a plug-in 28 may be compressed and packaged into a separate Java Archive File ("jar file"), which is a file format that allows the combination of multiple files into one file with a "jar" extension.

In certain embodiments, system 10 includes one or more backend connections 30. Backend connections 30 are operable to support communication between a plug-in 28 and its corresponding computing environment 12. In the illustrated example, plug-ins 28a and 28b communicate using backend connection 30a (i.e., connection type x) and plug-in 28n communicates using backend connection 30*b* (i.e., connection type y). Backend connection 30*a* may support, for example, communication of a command to computing environment 12*a* modeled by the object 24 mapped to plug-in 28*a*. As another example, backend connection 30*b* may support communication of a query (e.g., to request status information or other computing environment data) to computing environment 12*b* associated with the object 24 mapped to plug-in 28*b*.

In certain embodiments, the type of the object 24 (e.g., based on the computing environment 12 modeled by the object 24) mapped to a plug-in 28 may determine what types of backend connections 30 are permissible for that object 24. Although a particular number and types of backend connections 30 are illustrated, the present invention contemplates system 10 including any suitable number and types of backend connections 30, according to particular needs. Additionally, although backend connections are generally described as a separate component for generating unified user interface 16, the present invention contemplates specifying backend connections 30 within plug-ins 28 or at any other suitable location. In certain embodiments, providing backend connections 30 be desirable because it may separate the maintenance of this component of unified user interface 16 from the maintenance of framework user interface 26 and plug-ins 28.

Backend connections 30 may facilitate a wide variety of communication mechanisms and may separate the maintenance of these connections from the scope of plug-ins 28. Backend connections 30 correspond to one or more links 32. Links 32 facilitate wireless or wireline communication. Links 32 may communicate, for example, IP packets, Frame Relay frames, ATM cells, voice, video, data, and other suitable information between network addresses. Links 32 may include one or more LANs, RANs, MANs, WANs, all or a portion of the global computer network known as the Internet, and/or any other communication system or systems at one or more locations. Links 32 may or may not be a part of network 18. In certain embodiments, backend connections 30 provide secure communication between a plug-in 28 and its corresponding computing environment 12. Example backend connections 30 include secure shell (SSH) and secure shell two (SSH2).

In general, unified user interface 16 is generated by displaying at least a portion of framework user interface 26 and applying one or more appropriate plug-ins 28 to framework user interface 26. Backend connections 30 may provide the communication connection between plug-ins 24 and appropriate computing environments 12. Unified user interface 16 may allow users to interact seamlessly with objects 24 that model computing environments 12 of various types, provided that there is a plug-in 28 that corresponds to the computing environment 12 that corresponds to such an object 24. Plug-ins 28 may make unified user interface 16 a scalable, robust interface, and may separate the basics of user interface 16 from the specifics relevant to each computing environment 12. This may focus the maintenance of user interface 16 on framework interface 26, plug-ins 28, or connections 30.

In operation of an example embodiment of system 10, at least a portion of framework user interface 26 may be displayed. As described above, framework user interface 26 may comprise common functionality and a standard layout for unified user interface 16. The portion of framework user interface 26 that is displayed may include some or all of framework user interface 26. The portion may include, for example, one or more panels, one or more menu bars, one or more toolbars, or any other suitable elements of framework user interface 26.

A listing of a subset of the plurality of heterogeneous computing environments 12 may be displayed. For example, a view tree or other hierarchical listing of computing environments 12 (possibly including components of computing environments 12) may be displayed. A user may be able to interactively select computing environments 12 (and components of computing environments 12) from the listing. In certain embodiments, each of the plurality of heterogeneous computing environments 12 that are displayed in the listing may be modeled by one or more objects 24, each object 24 corresponding to a particular computing environment 12.

In response to an interaction request with respect to a particular computing environment 12, an appropriate plug-in 28 may be applied, based on a mapping of the object 24 that corresponds to the particular computing environment 12 to the appropriate plug-in 28, to perform the requested interaction. The interaction request may include, for example, a request to expand a node in the view tree, a request to collapse a node in the view tree, a request to display a menu of possible actions, a request to view computing environment data associated with one or more computing environments 12, a request to perform a command with respect to one or more computing environments 12 and display the command output, or any other suitable request for managing computing environments 12 using unified user interface 16. As described above, each plug-in 28 may correspond to a type of computing environment may be operable to facilitate display of information for managing a computing environment 12 of the type corresponding to the plug-in 28.

The objects 24 that model computing environments 12 may be mapped to an appropriate plug-in 28 based on the type of the computing environment 12 modeled with the object 24. One or more keys may be generated for the mapping. This mapping may be useful, for example, in determining the proper plug-in 28 to call when a particular computing environment 12 is selected for display of computing environment data in user interface 16. For example, the mapping may comprise a unique one-to-one mapping from the type of computing environment 12 to a plug-in 28. As a particular non-limiting example, the mapping may include one or more of a business process view class, a platform class, a property value, and any other suitable values according to particular needs. The business process view class may be based on the class of the object 24 in the hierarchy, as described above. The platform class may include an identification of the computing environment 12 that is modeled by the object 24 associated with the plug-in 28. The property value may include any suitable property, according to particular needs. For example, the property value may include a Platform_Type value. In certain embodiments, the property value may be considered an optional property that is useful when the business process view class and platform class are not unique enough to distinguish the correct plug-in 28 to load. Although these particular example keys are primarily described, the present invention contemplates mapping plug-ins 28 to associated computing environments 12 in any suitable manner, according to particular needs.

User interface-generating module 19, object manager 20, and memory module 22 may be implemented in any suitable number of computer modules and may perform the functionality described with reference to system 10 in any suitable combination according to particular needs. Moreover, these components of system 10 may interact with any suitable processors or memory modules of system 10 to perform the functionality described with reference to system 10.

Particular embodiments of the present invention may provide one or more technical advantages. Previous and existing solutions for managing computing environments 12 are vendor-specific in that they do not provide for management of a plurality of vendor-specific computing environments 12, particularly not from a centralized management user interface 16. As a result, computing environments 12 have typically been managed individually, through vendor-specific and type-specific user interfaces. These and other deficiencies of existing systems often make it difficult to manage the various computing environments 12 of an entity because a user, such as a system administrator, may be required to learn multiple vendor-specific and/or type-specific user interfaces. For example, with previous and existing systems, it may be difficult to manage a set of complex, heterogeneous computing environments 12, such as the computing environments of a large enterprise.

Certain embodiments of the present invention, however, may provide unified user interface 16 for managing a plurality of heterogeneous computing environments 12, such as those from multiple vendors and/or of different types, in a substantially uniform manner. For example, the unified user interface 16 provided by the present invention may provide the ability to manage the various computing environments 12 of an enterprise or other entity through a common user interface 16, which may provide a single point of control for the multiple, heterogeneous computing environments 12 of an enterprise or other entity. This single point of control may provide a common look and feel for managing the various computing environments 12. For example, the present invention may allow a user to view, manage, and administrate different computing environments 12 across different platforms operating on different operating systems, using a single user interface 16 providing a common look and feel to the user.

In certain embodiments, the present invention provides a user such as a systems administrator with more control over the types of computing environments 12 that the user can manage from a single interface 16. A developer, for example, may have the ability to add or remove plug-ins and to thereby change the scope of the computing environments 12 that can be managed. In certain embodiments, a developer has the ability to provide updates and fixes to components in a plug-in format while keeping framework user interface 26 of unified user interface 16 untouched, which may decrease the time for integrating functionality into the unified user interface.

Figure 3:
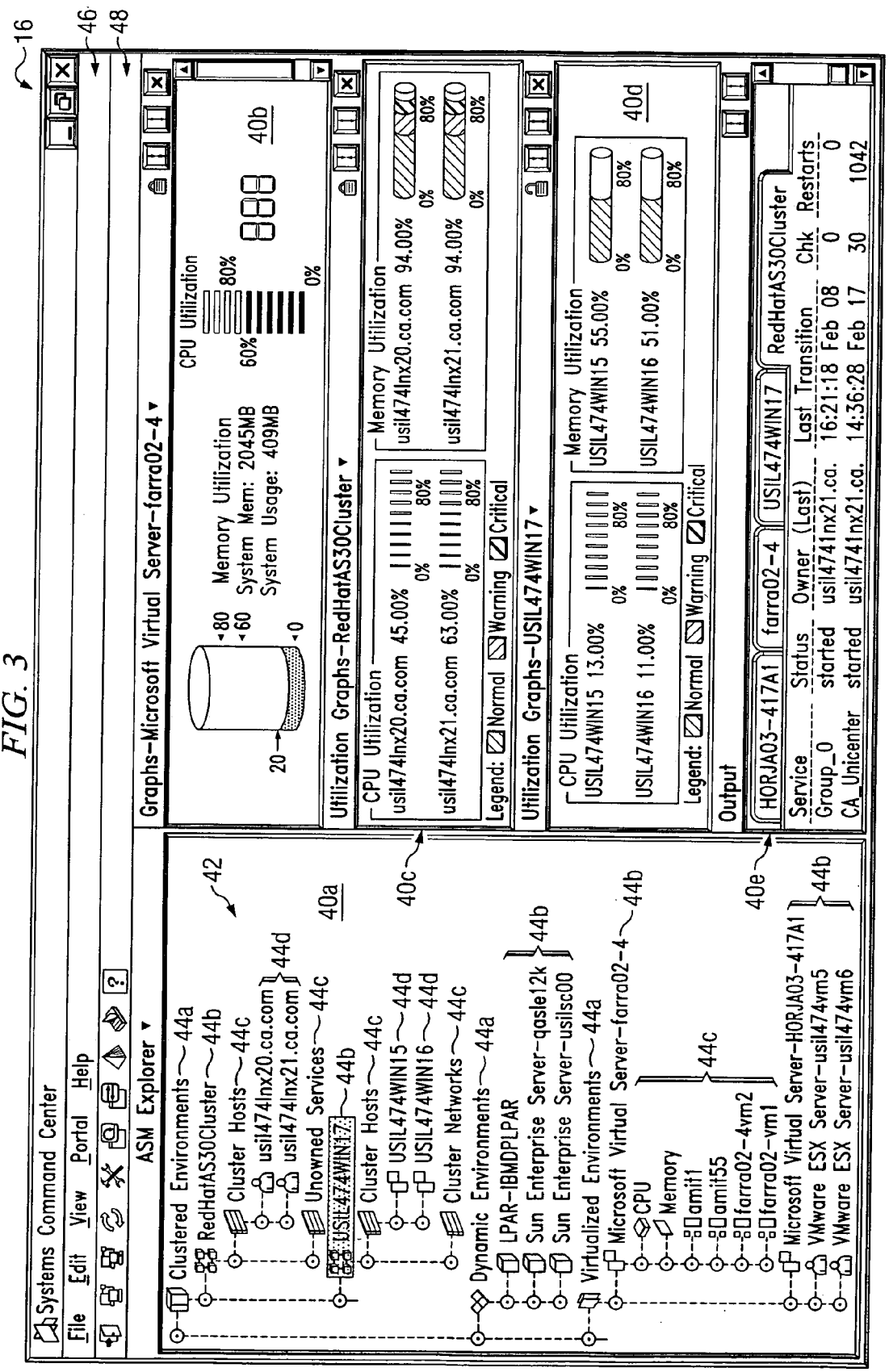
FIG. 3 illustrates an example unified user interface for managing a plurality of heterogeneous computing environments according to certain embodiments of the present invention.

FIG. 3 illustrates an example unified user interface 16 for managing a plurality of virtual environments 12 according to certain embodiments of the present invention. In certain embodiments, unified user interface 16 is generated by user interface-generating component 19 of management computer system 14 and displayed on a monitor or other display device of management computer system 14.

Unified user interface 16 may be displayed as a window that comprises one or more panels 40. Although a particular number of panels 40 are illustrated and described with respect to FIG. 3, the present invention contemplates user interface 16 comprising any suitable number of panels 40. Additionally, although a particular arrangement of panels 40 is illustrated and described with reference to FIG. 3, the present invention contemplates any suitable arrangement of panels 40, according to particular needs. Panels 40 and the arrangement of panels 40 may be provided by framework user interface 26.

A first panel 40a (the left-hand panel in the illustrated example) may display icons for the one or more computing environments 12 (and possibly for one or more components of computing environments 12) in a listing of computing environments 12, in a tree structure for example. This tree structure may be referred to as a view tree 42. For example, the first panel may allow a user to browse objects 24 queried from memory module 22 based on one or more restrictions applied by framework user interface 26 and if supported by an implemented plug-in 28. These objects 24 may be displayed in the first panel as icons in view tree 42, which may be arranged in a hierarchy (e.g., based on the business process view of objects 24).

View tree 42 includes a number of nodes 44, which may be arranged according to a hierarchy. For example, the hierarchy of nodes 44 may comprise all or a portion of the business process view of objects 24 in memory module 22. Nodes 44 of view tree 44 may be expandable and collapsible. The various icons for the computing environments 12 and components of computing environments 12 may be displayed at nodes 44 of view tree 42. Additionally, each node 44 may include an explanatory label that provides a name for the computing environment 12 (or component of computing environment 12) represented by the node 44. As will be described in more detail below with reference to FIGS. 6-7, view tree 42 may be generated from a cache tree, which may improve performance of unified user interface 16. The cache tree may be stored in a memory module of management computer system 14 or at any other suitable location.

A first node layer (i.e., those nodes identified as nodes 44a) may comprise the types of computing environments 12. For example, the first node layer in the illustrated example includes nodes 44a for cluster environments, dynamic environments, and virtual environments.

Within each of the nodes 44a of the first node layer may be child nodes 44 in a second node layer (i.e., those nodes identified as nodes 44b) that correspond to the actual vendor-specific implementations of computing environments 12. For example, the particular instances of computing environments 12 that are modeled as objects 24 and that have a corresponding plug-in 28 may be shown in second node layer 44b. Nodes 44b of the second node layer that are children of cluster environment node 44a may include the cluster environments of system 10, nodes 44b of the second node layer that are children of dynamic environment node 44a may include the dynamic environments of system 10, and nodes 44b of the second node layer that are children of virtual environment node 44a may include the virtual environments of system 10.

Within each of the nodes 44b of the second node layer may be child nodes 44 in a third node layer (i.e., those nodes identified as nodes 44c) that correspond to a first layer of components within a particular computing environment 12. As just one example, the components of Microsoft Virtual Server—farra02-4 in this example include a central processing unit CPU, a memory, and a number of virtual machines (i.e., amit 1, amit55, farra02-4vm2, and farra02-vm1). Fewer or additional node layers may exist in view tree 42 without departing from the spirit and scope of the present invention. For example, a fourth node layer (e.g., those nodes 44 identified as nodes 44d) may also be included in view tree 42, if appropriate.

Unified user interface 16 may also include a number of additional panels 40 that may display computing environment data that is specific to particular computing environments 12, such as computing environment data for monitoring computing environments 12 and output of commands issued to computing environments 12 (e.g., using user interface 16). For example, computing environment data may include data regarding a particular computing environment 12. The display of computing environment data in a panel 40 may include specific data, properties, graphs, icons, or graphical representations about computing environments 12. The determination of what computing environment data is available to be displayed and the manner of presentation may be specified by the plug-in 28 mapped to the object 24 that models the computing environment 12 (or component of computing environment 12) that is selected for display of computing environment data.

In the illustrated example, panels 40b-40d each display computing environment data for a particular computing environments 12, and panel 40e displays output generated in response to command execution by a particular computing environment 12. In this particular example, panel 40b displays computing environment data relating to memory utilization and CPU utilization for a MICROSOFT VIRTUAL SERVER (i.e., identified as faraa02-4) computing environment 12. The computing environment data in this example is displayed using graphical representations, such as the partially-filled database graphical representation to depict memory utilization, that are generated according to one or more values stored in the appropriate object 24. In this particular example, panel 40c displays computing environment data relating to CPU utilization and memory utilization for a REDHAT AS30 cluster computing environment 12. The computing environment data in this example is displayed using somewhat different icons than were used for that MICROSOFT VIRTUAL SERVER computing environment 12 in panel 40b. In this particular example, panel 40d displays computing environment data relating to CPU utilization and memory utilization for a USIL474WIN17 cluster computing environment 12.

In this particular example, panel 40b displays computing environment data regarding a different type of computing environment 12 (e.g., a virtual environment) than panels 40c and 40d (which each display computing environment data regarding cluster environments). Additionally, in this particular example, although panels 40c and 40d both display computing environment data regarding cluster environments, the cluster environments are associated with different vendors.

Panel 40e, in this particular example, displays output generated in response to command execution by computing environments 12. For example, using unified user interface 16, a user may request that a command for a particular computing environment 12 be issued, and panel 40e of framework user interface 26 may display the output of the command after execution by the particular computing environment 12. The output may be contained within its own tab based upon the name of the computing environment 12. For example, tabs within panel 40e correspond to one or more of the various computing environments 12 that are managed using interface 16 (e.g., HORJA03-417A1, farra02-4, USIL474WIN17, and REDHATAS30Cluster).

In certain embodiments, the standard layout provided by framework user interface 26 may include one or more menus 46 and one or more toolbars 48. Menus 46 and toolbars 48 may present a user with a familiar look and feel by using a set of standard menus 46 and toolbars 48 that resemble those of a typical user interface. Menus 46 may facilitate manipulation of panels 40 and management of computing environments 12, and may provide any other suitable functionality according to particular needs. Menus 46 may comprise a number of drop-down menus, for example. Toolbar 48 includes a number of shortcut icon buttons that may facilitate manipulation of panels 40 and management of computing environments 12, and may provide any other suitable functionality according to particular needs.

In certain embodiments, panels 40, menus 46, and toolbars 48 of unified user interface 16 are provided by framework user interface 26, while the computing environment data displayed within each of panels 40 is provided using one or more plug-ins 28.

Figure 4:
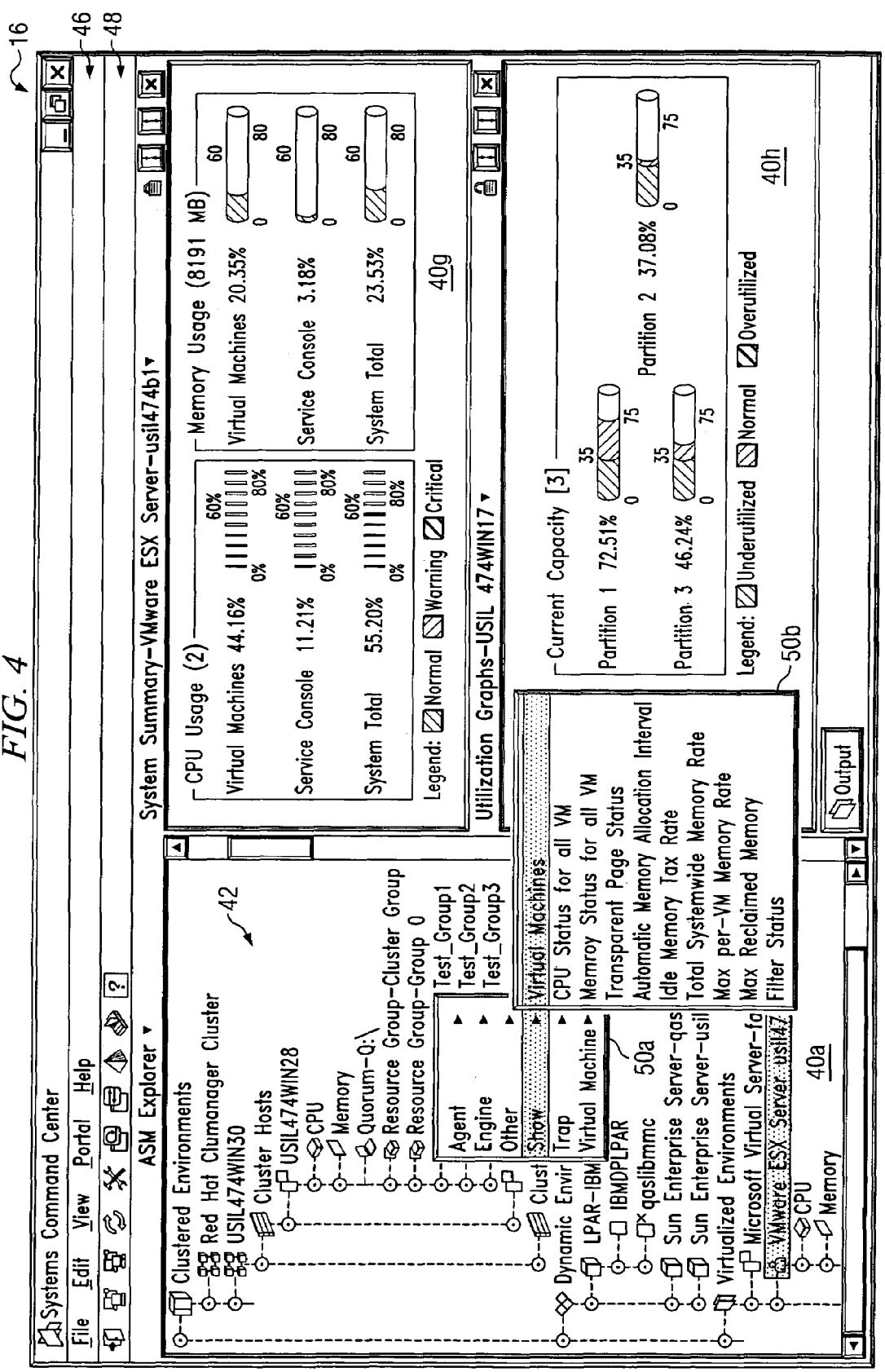
FIG. 4 illustrates an example unified user interface for managing a plurality of heterogeneous computing environments according to certain embodiments of the present invention.

FIG. 4 illustrates an example unified user interface 16 for managing a plurality of virtual environments 12 according to certain embodiments of the present invention. In certain embodiments, the example unified user interface 16 illustrated in FIG. 4 operates in substantially the same manner as described above with reference to FIG. 3 and includes substantially similar features to those described above with reference to FIG. 3. To avoid cluttering the illustration of first panel 40a in FIG. 4, the reference numerals for nodes 44 have not been included.

The example embodiment of unified user interface 16 illustrated in FIG. 4 includes view tree 42 displayed in panel 40a, as well as computing environment data specific to particular computing environments 12 displayed in panels 40g and 40h. For example, panel 40g displays CPU usage information and memory usage information regarding a first computing environment 12 (i.e., a VMWARE ESX virtual environment), while panel 40h displays current capacity information regarding three partitions of a second computing environment 12 (i.e., an IBM POWER4 Series system). The computing environment data displayed in each of panels 40g and 40h may be accessed and displayed according to the respective plug-ins 28 mapped to the objects 24 that model these computing environments 12.

As shown in panel 40a, one or more pop-up menus 50 may be displayed on unified user interface 16. A user may right-click, for example, on a particular node 44 in view tree 42, and one or more expandable pop-up menus 50 may be displayed. For example, in response to a user right-clicking or otherwise selecting a particular node 44 in view tree 42, a first pop-up window 50a may displayed. First pop-up menu 50a may include a number of options that a user can browse to cause a second pop-up menu 50b to be displayed. The second pop-up menu 50b may include a number options relevant to a selected option in first pop-up menu 50a. The options provided in pop-up menus 50 may allow a user to manage computing environments 12. For example, pop-up menus 50 may allow the user to control what is shown in other panels 40 of unified user interface 16 (e.g., requesting computing environment data about the selected computing environment 12), issue commands to particular computing environments 12, or perform any other suitable actions for managing computing environments 12. In certain embodiments, certain of the options provided in pop-up menus 50 may also be provided in menus 46 and/or toolbar 48.

The availability of pop-up menus 50 and the content of pop-up menus 50 may be controlled by the plug-in 28 that corresponds to the selected computing environment 12. For example, in response to user selection of a node 44 in view tree 42, the plug-in 28 mapped to the object 24 corresponding to the selected node 44 may be determined (e.g., using the key associated with the selected node 44) and the appropriate one or more pop-up menus 50 may be accessed in a common framework cache and subsequently displayed.

FIG. 5 illustrates an example method for providing unified user interface 16 for managing a plurality of heterogeneous computing environments 12 according to certain embodiments of the present invention. At step 500, one or more computing environments 12 are modeled as objects 24. In certain embodiments, object manager 20 of system 10 models computing environments 12 as objects 24 and stores objects 28 in memory module 22. As described above, objects 24 may be arranged in a hierarchy, such as a business process view, which may facilitate identification and classification of objects 24. As an example, one or more objects 24 may be used to model a particular computing environment 12. A first object 24 may model the particular computing environment 12 as a parent object 24, and one or more additional objects 24 may model components of the particular computing environment 12 as child objects 24 in one or more levels. Objects 24 may be updated with computing environment data on a scheduled or other basis regarding the modeled computing environments. This computing environment data may include computing environment data received by object manager 20 from data collectors, for example.

At step 502, framework user interface 26 is provided. As described above, framework user interface 26 may comprise a standard layout and a set of common functionality for generating unified user interface 16. The standard layout may include one or more panels, one or more toolbars, one or more menus, various icons, one or more graphical representations, and any other suitable elements for a user interface. The common functionality may include management functions that are common to a group of computing environments 12, or any other suitable functions, and functions for manipulating the display of unified user interface 16.

At step 504, one or more plug-ins 28 may be provided. Plug-ins 28 may provide functionality and display elements that are specific to a particular type of computing environment 12. As described above, each plug-in 28 may correspond to one or more particular computing environments 12 and may facilitate display of computing environment data related to its corresponding one or more computing environments 12. This computing environment-specific functionality may enhance the standard layout and set of common functionality provided by framework user interface 26.

At step 506, one or more backend connections 30 may be provided. As described above, backend connections 30 are operable to support communication between a plug-in 28 and its corresponding computing environment 12. In certain embodiments, the type of the object 24 (e.g., based on the computing environment 12 modeled by the object 24) mapped to a plug-in 28 may determine what types of backend connections 30 are permissible for that object 24. Additionally, although backend connections are generally described as a separate component for generating unified user interface 16, the present invention contemplates specifying backend connections 30 within plug-ins 28 or at any other suitable location. In certain embodiments, providing backend connections 30 be desirable because it may separate the maintenance of this component of unified user interface 16 from the maintenance of framework user interface 26 and plug-ins 28.

At step 508, unified user interface 16 may be generated according to framework user interface 26 and one or more plug-ins 28. For example, generating unified user interface 16 may include displaying at least a portion of framework user interface 26 and displaying content provided by one or more plug-ins 28. In certain embodiments, one or more backend connections 30 may also be used in generating unified user interface 16.

FIG. 6 illustrates an example method for providing unified user interface 16 for managing computing environments 12 according to certain embodiments of the present invention. The method illustrated in FIG. 6 assumes that at least certain of the plurality of computing environments 12 have been modeled as objects 24, and that framework user interface 26 and one or more plug-ins 28 have been provided.

At step 600, plug-ins 28 may be initialized. In certain embodiments (e.g., in an implementation in which the plug-ins 28 are defined as jar files), plug-ins 28 are initialized by searching a defined directory path for jar files, loading the specific jar files into a class loader, and instantiating and invoking methods upon the specified plug-in 28.

At step 602, plug-ins 28 may be loaded. For example, user interface-generating component 19 may load all of the available plug-ins 28. In certain embodiments, loading plug-ins 28 comprises loading certain details provided by plug-ins 28 into an internal cache (referred to as a common framework cache) of management computer system 14 or another suitable component of system 10. These details may include, for example, various icons, commands, command menus, graphical elements, or other suitable details provided by the plug-ins 28 for computing environments 12. In certain embodiments, the common framework cache is distinct from the cache tree.

At step 604, the plurality of objects 24 that model computing environments 12 may be accessed. For example, user interface-generating component 19 may access objects 24 in memory module 22. Each object 24 may correspond to a particular computing environment 12 in the plurality of computing environments 12, and multiple objects 24 may correspond to a single computing environment 12. For example, a parent object 24 may correspond to the computing environment 12, and one or more child objects 24 may correspond to one or more components of the computing environment 12.

At step 606, each object 24 in at least a subset of the plurality of objects 24 may be mapped to a corresponding plug-in 28. As described above, each plug-in 28 may correspond to a particular type of computing environment 12 and is operable to facilitate display of information for managing a computing environment 12 of the corresponding type. The information for managing computing environments 12 may include computing environment data or any other suitable information, according to particular needs.

The subset may include one or more, and possibly all, objects 24. In certain embodiments, user interface-generating component 19 or another suitable component of system 10 may, for each object 24 in the plurality of objects 24, determine whether a plug-in 28 exists that corresponds to the type of the computing environment 12 corresponding to that object 24, and if it is determined that such a plug-in 28 exists, map that object 24 to the determined plug-in 28. In certain embodiments, mapping objects 24 to plug-ins 28 may be performed as part of a process for generating a user interface tree representation of objects 24. This tree representation may include one or more of a cache tree and a view tree 42. An example method for generating this tree representation is described below with reference to FIG. 7. At step 608, the mappings of the subset of objects 24 to corresponding plug-ins 28 may be stored. For example, the cache tree may be stored in a memory module of management computer system 14 and may include a key for mapping objects 24 at the nodes of the cache tree to appropriate plug-ins 28.

At step 610, at least a portion of framework user interface 26 is displayed. For example, at least a portion of the standard layout provided by framework user interface 26 may be displayed. In certain embodiments, one or more panels 40, one or more menus 46, one or more toolbars 48, and any other suitable portions of the standard layout of framework user interface 26 may be displayed. Additionally or alternatively, in certain embodiments, at least a portion of the set of common functionality provided by framework user interface 26 may available.

At step 612, a listing of a subset of computing environments 12 may be displayed. The subset may include some or all of the computing environments 12 that are modeled as objects 24. The listing may provide a hierarchical listing of the available computing environments 12 that is expandable and collapsible. This may allow a user to view the available computing environments 12 and components of those computing environments 12. In certain embodiments, the listing comprises view tree 42. View tree 42 may be generated from the stored cache tree. In certain embodiments, steps 610 and 612 may be performed substantially simultaneously. For example, view tree 42 may be displayed in a panel (e.g., panel 40*a*) provided by framework user interface 26. In certain embodiments, the portion of view tree 42 that is initially displayed comprises a default level in the business process view hierarchy. For example, the initial portion of view tree 42 displayed may include nodes 44 for each of the different types of computing environments 12. For example, an initial display of view tree 42 may include three nodes 44, a first node 44 for clustered computing environments, a second node 44 for dynamic computing environments, and a third node 44 for virtual computing environments. The user may then expand those nodes 44 to view the particular instances of computing environments 12 for each type of computing environment 12.

At step 614, user interface-generating component 19 may process interaction requests. For example, a user of management computer system 14 may submit one or more requests for managing computing environments 12 using unified user interface 16. The interaction request may include, for example, a request to expand a node 44 in view tree 42, a request to collapse a node 44 in view tree 42, a request to display a menu of possible actions (e.g., pop-up menu 50), a request to view computing environment data associated with one or more computing environments 12, a request to perform a command with respect to one or more computing environments 12, a request to view command output with respect to one or more computing environments 12, or any other suitable request for managing computing environments 12 using unified user interface 16. An example method for processing example user interactions with unified user interface 16 according to certain embodiments of the present invention is described below with reference to FIGS. 8A-8B.

FIG. 7 illustrates an example method for generating a user interface tree representation for generating unified user interface 16 according to certain embodiments of the invention. In certain embodiments, the user interface tree representation comprises a cache tree and a view tree 42. At step 700, the business process view arrangement of objects 24 may be accessed. As described above, objects 24 of memory module 22 may be categorized and stored in a hierarchy, which for exemplary purposes is referred to as the business process view. The business process view may include, for example, a hierarchical classification of the computing environments 12 and the components of computing environments 12 of an entity. Each node in the business process view may be associated with one or more objects 24. In certain embodiments, the root node of the business process view may be accessed by user interface-generating module 19 to begin the process of generating the user interface tree representation.

At step 702, a determination is made regarding whether there are any child objects 24 to load. For example, it may initially be determined whether there are any child nodes from the root node of the business process view. If it is determined at step 702 that there are no child objects 24 to load, then the method may end. If it is determined at step 702 that there are one or more child objects 24 to load, then the method may proceed to step 704. At step 704, a determination is made regarding whether a plug-in 28 exists that corresponds to the type of the computing environment 12 corresponding to the detected one or more child objects 24. If it is determined at step 704 that a plug-in 28 does not exist that corresponds to the type of the computing environment 12 corresponding to the detected one or more child objects 28, then the detected one or more child objects 28 may be dismissed. For example, the detected child objects 24 may not be added to the user interface tree.

If it is determined at step 704 that there is a plug-in 28 that corresponds to the type of the computing environment 12 corresponding to the detected one or more child objects 24, then at step 708 the detected one or more child objects 24 may be added to the user interface tree. For example, the detected one or more child objects 24 may be added to the cache tree. At step 710, data from objects 24 is loaded into the user interface tree according to information needed by the plug-in 28 that corresponds to the type of the computing environment 12 corresponding to the detected one or more child objects 24. The data from the objects 24 may include any suitable information for generating displays associated with a computing environment 12 of the type that corresponds to plug-in 28.

The method may return to step 702 to determine if there are any more child objects 24 to load. In certain embodiments, the method described with reference to FIG. 7 is performed with respect to all objects 24 stored in memory module 22 that are properly categorized in business process view. Additionally, the unique keys associated with the nodes of the user interface tree may be generated when mapping an object 24 to its plug-in 28. Additionally, in certain embodiments, the cache tree may be updated on a substantially continuous or scheduled basis with information regarding objects 24, using a background thread for example.

Figure 8A:
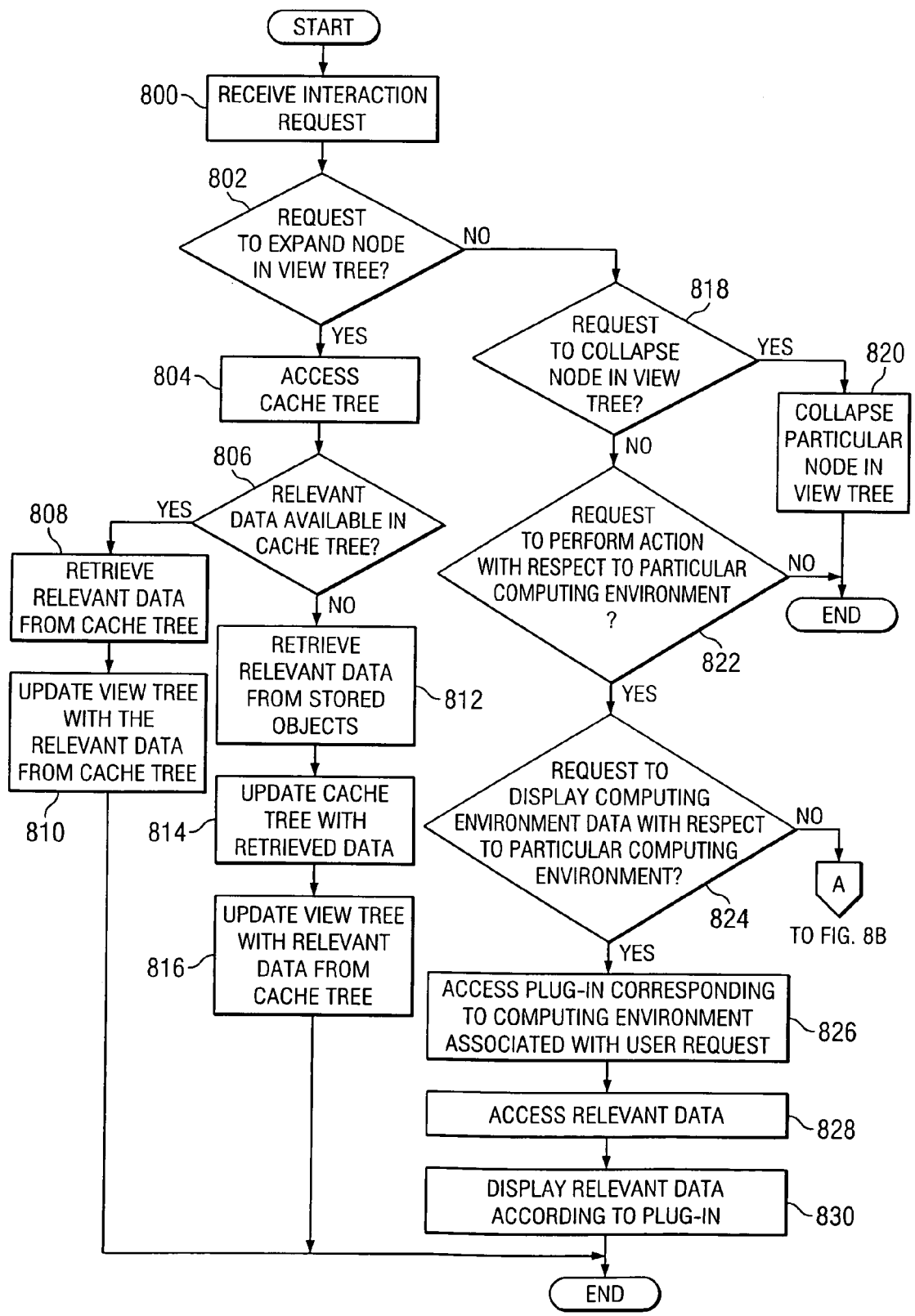

FIGS. 8A-8B illustrate an example method for processing example user interactions with unified user interface 16 according to certain embodiments of the present invention. Although particular types of user interaction are described with reference to FIGS. 8A-8B, the present invention contemplates any suitable type of user interaction with user interface 16 to perform any suitable actions with respect to one or more computing environments 12. Additionally, for purposes of this example, it will be assumed that both a user interface tree representation that comprises both a cache tree and a view tree has been generated.

At step 800, user interface-generating component 19 may receive an interaction request via unified user interface 16. The interaction request may include, for example, a request to expand a node 44 in view tree 42, a request to collapse a node 44 in view tree 42, a request to display a menu of possible actions (e.g., pop-up menu 50), a request to view computing environment data associated with one or more computing environments 12, a request to perform a command with respect to one or more computing environments 12, a request to view command output with respect to one or more computing environments 12, or any other suitable request for managing computing environments 12 using unified user interface 16. The interaction request may include an identification of any suitable combination of a particular computer environment 12, one or more components of a particular computing environment 12, or any other suitable information.

At step 802, user interface-generating component 19 may determine whether the interaction request comprises a request to expand a particular node 44 in view tree 42. If it is determined at step 802 that the interaction request comprises a request to expand a particular node 44 in view tree 42, then at step 804 user interface-generating component may access the cache tree. At step 806, user interface-generating component 19 may determine whether the relevant data for expanding the particular node 44 identified in the interaction request is available in the cache tree. For example, user interface-generating component 19 may determine whether the relevant data for the one or more child nodes 44 at the next layer of the business process view from the particular node 44 is available in the cache tree. As a particular example, if the particular node 44 identified in the interaction request corresponds to a virtual environment, then the relevant data may comprise information for displaying the nodes 44 of the one or more virtual servers of the identified computing environment 12.

If it is determined at step 806 that the relevant data for expanding the node 44 identified in the interaction request is available in the cache tree, then at step 808 the relevant data may be retrieved from the cache tree, and at step 810 user interface-generating component 19 may update view tree 42 with the relevant data from the cache tree such that the particular node 44 is expanded to include one or more child nodes 44. Continuing with the particular example described above, if the relevant data comprises information for displaying the nodes 44 of the one or more virtual servers of the identified computing environment 12, then view tree 42 may be updated by expanding the selected node 44 of the identified computing environment and adding the nodes for the one or more virtual servers of the selected computing environment 12 to view tree 42.

If it is determined at step 806 that the relevant data for expanding the node 44 identified in the interaction request is not available in the cache tree, then at step 812 user interface-generating component 19 may retrieve the relevant data from the one or more appropriate objects 24 stored in memory module 22. The appropriate one or more objects 24 may include the one or more objects 24 that correspond to the particular node 44 in view tree 42. At step 814, user interface-generating component 19 may update the cache tree with the retrieved data, and at step 816 user interface-generating component 19 may update view tree 42 with the relevant data from the cache tree. For example, the relevant data from the cache tree may include a portion or all of the data retrieved from the one or more objects at step 814. In certain embodiments, the cache tree may be updated on a scheduled or other basis by a background thread that is running substantially continuously. In such embodiments, to perform steps 812-816, the background thread may be interrupted and paused, and then returned to its normal state after performance of steps 812-816 or at another suitable time.

Returning to step 802, if user interface-generating component 19 determines that the interaction request is not a request to expand a node in view tree 42, then at step 818 user interface-generating component 19 may determine whether the interaction request comprises a request to collapse a node 44 in view tree 42. If user interface-generating component 19 determines at step 818 that the interaction request comprises a request to collapse a particular node 44 in view tree 42, then at step 820 user interface-generating component 19 may collapse the particular node 44.

Returning to step 818, if user interface-generating component 19 determines at step 818 that the interaction request does not comprise a request to collapse a node 44 in view tree 42, then at step 822 user interface-generating component 19 may determine whether the interaction request comprises a request to perform an action with respect to a particular computing environment 12. For example, a request to perform an action with respect to a particular computing environment 12 may include a request to perform any suitable action for managing computing environments 12 that can be submitted using user interface 16.

If user interface-generating component 19 determines at step 822 that the interaction request comprises a request to perform an action with respect to a particular computing environment 12, then at step 824 user interface-generating component 19 may determine whether the request comprises a request to display computing environment data with respect to a particular computing environment 12. For example, the requested action may comprise displaying selected computing environment data for a computing environment 12 as a whole, displaying selected computing environment data for one or more components of a computing environment 12, or displaying any other suitable data. The user may submit the request for computing environment data by making a selection using one or more pop-up menus 50 or by simply selecting a node in view tree 42, for example.

If user interface-generating component 19 determines at step 824 that the request comprises a request to display computing environment data with respect to a particular computing environment 12, then at step 826 user interface-generating component 19 may access the plug-in 28 that corresponds to the computing environment 12 associated with the interaction request. User interface-generating component 19 may determine the corresponding plug-in 28 to access in any suitable manner. For example, as described above, each node 44 in view tree 42 may be associated with a unique identifier or key that maps the node 44 to its corresponding plug-in 28. When the user selects a node (e.g., by one or more mouse clicks) and submits the interaction request using pop-up menus 50, the key for the currently selected node 44 may be automatically associated with the interaction request. In certain embodiments, a user may highlight a selected node 44 (e.g., by clicking on the node 44) and generate the request using one or more of menus 46 and toolbars 48. Additionally, by simply selecting a node in view tree 42, the plug-in 28 may be accessed for automatic display of certain information in one or more panels 40. The key of the currently highlighted node 44 may be automatically associated with the interaction request.

At step 828, computing environment data responsive to the interaction request may be accessed. For example, computing environment data for the computing environment 12 identified in the interaction request may be accessed. The computing environment data may be accessed from one or more of the cache tree, from objects 24 in memory module 22 that model the identified computing environment, or from the computing environments 12. As a particular example, in response to an interaction request for computing environment data, the particular computing environment 12 associated with the request may be queried for the responsive computing environment data. In certain embodiments, the appropriate backend connection 30 for the plug-in 28 determined at step 826 may be determined and used for querying the particular computing environment 12. At step 830, the computing environment data responsive to the interaction request may be displayed in unified user interface 16. For example, the responsive computer environment data may be displayed in a panel 40 of unified user interface 16, which may be determined by framework user interface 26. In certain embodiments, the plug-in 28 for the selected computing environment 12 may dictate the manner of display of the responsive computing environment data.

Returning to step 824, if user interface-generating component 19 determines at that the request does not comprise a request to display computing environment data with respect to a particular computing environment 12, then at step 832, user interface-generating component 19 may determine whether the request comprises a request to issue a command with respect to one or more computing environments 12. For example, the interaction request may include a request to control one or more computing environments 12 (e.g., one or more components of a computing environment 12) by issuing one or more commands. If user interface-generating component 19 determines at step 832 that the request comprises a request to issue a command with respect to one or more computing environments 12, then at step 834 user interface-generating component 19 may access the plug-in 28 that corresponds to the computing environment 12 associated with the interaction request.

User interface-generating component 19 may determine the corresponding plug-in 28 to access in any suitable manner. For example, as described above, each node 44 in view tree 42 may be associated with a unique identifier or key that maps the node 44 to its corresponding plug-in 28. When the user selects a node (e.g., by one or more mouse clicks) and submits the interaction request using pop-up menus 50, the key for the currently selected node 44 may be automatically associated with the interaction request. In certain embodiments, a user may highlight a selected node 44 (e.g., by clicking on the node 44) and generate the request using one or more of menus 46 and toolbars 48. The key of the currently highlighted node 44 may be automatically associated with the interaction request. The displayed commands available for a particular computing environment 12 may be determined by the plug-in 28 that corresponds to the particular computing environment 12. Those commands may have been loaded into the common framework cache, as described above.

At step 836, user interface-generating component 19 may issue the command identified in the interaction request with respect to the identified computing environment 12. In certain embodiments, user interface-generating component 19 or another suitable component of system 10 may determining a backend connection type 30 for connecting to the particular computing environment 12 and issue the command to the particular computing environment 12 via a link 32 of the determined backend connection type 30.

At step 838, a determination is made regarding whether there is command output to be displayed. For example, in response to execution of the command by the appropriate computing environment 12, output may be received that is appropriate for display in user interface 16 (as may be determined by the corresponding plug-in 28 for the appropriate computing environment 12). If it is determined at step 838 that there is no command output to be displayed, then the method may end. If it is determined at step 838 that there is command output to be displayed, then at step 840 the plug-in 28 corresponding to the appropriate computing environment 12 may be accessed to determine how to display the command output. At step 842, the command output may be displayed in unified user interface 16. For example, the command output may be displayed in unified user interface 16 according to the accessed plug-in 28 and the framework user interface 26.

Returning to step 822, if user interface-generating component 19 determines that the interaction request does not comprise a request to perform an action with respect to a particular computing environment 12, then the method may end. Although decisions regarding particular types of requests are described with reference to steps 802, 818, and 822, the present invention contemplates any other suitable types of interaction requests and appropriate decisions being made with respect to those types of interaction requests.

Although particular methods for generating a unified user interface 16 for managing multiple computing environments 12 have been described with reference to FIGS. 5-8, the present invention contemplates any suitable method for generating a unified user interface 16 for managing multiple computing environments 12 using one or more plug-ins 24 in accordance with the present description. Thus, certain of the steps described with reference to FIGS. 5-8 may take place simultaneously and/or in different orders than as shown. Moreover, components of system 10 may use methods with additional steps, fewer steps, and/or different steps, so long as the methods remain appropriate. Although certain components of system 10 are described as performing certain steps of the example methods described with reference to FIGS. 5-8, the present invention contemplates the steps being performed by any suitable components of system 10 in any suitable combination.

Additionally, although plug-ins 28 for cluster environments, virtual environments, and dynamic environments have been primarily described, the present invention contemplates system 10 including plug-ins 28 for any suitable type of computing environment 12 that could be managed using unified user interface 16. For example, a developer may define a new plug-in 28 for a new computing environment 12, and the new plug-in 28 may enable the new computing environment 12 to be developed using unified user interface 16.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for providing a unified user interface for managing a plurality of heterogeneous computing environments, the method comprising:
    displaying at least a portion of a framework user interface, the framework user interface comprising common functionality and a standard layout for a unified user interface for managing a plurality of heterogeneous computing environments;
    displaying a listing of a subset of the plurality of heterogeneous computing environments, each of the plurality of heterogeneous computing environments being modeled by one or more objects, each object corresponding to a particular computing environment; and
    in response to an interaction request with respect to a particular computing environment, applying an appropriate plug-in, based on a mapping of the object that corresponds to the particular computing environment to the appropriate plug-in, to perform the requested interaction, each plug-in corresponding to a type of computing environment and operable to facilitate display of information for managing a computing environment of the type corresponding to the plug-in.

2. The method of claim 1, comprising mapping the objects that model the plurality of computing environments to appropriate plug-ins by:
    accessing the objects that model the plurality of computing environments; and
    for each of the accessed objects:
        determining whether a plug-in exists that corresponds to the type of the computing environment corresponding to the object; and
        mapping, if it is determined that a plug-in exists that corresponds to the type of the computing environment corresponding to the object, the object to the plug-in that corresponds to the type of the computing environment that corresponds to the object.

3. The method of claim 1, comprising determining the appropriate plug-in to apply according to a key associated with particular computing environment in the listing of computing environments that is mapped to the particular computing environment, the key mapping the object corresponding to the particular computing environment to the appropriate plug-in.

4. The method of claim 1, comprising generating a cache tree representation of at least a portion of the objects, the cache tree comprising a plurality of nodes, each node of the cache tree being associated with an object that models at least a portion of the computing environment that corresponds to the object.

5. The method of claim 4, wherein:
the objects that model the plurality of computing environment are arranged according to a business process view of the plurality of computing environments; and
the nodes of the cache tree are arranged according to the business process view arrangement of the objects.

6. The method of claim 4, comprising:
generating a view tree from the cache tree, the view tree comprising at least a portion of the nodes of the cache tree, each node associated with a corresponding computing environment and a key mapping the node to its corresponding plug-in; and
displaying the view tree, the listing of the subset of computing environments comprising the view tree.

7. The method of claim 6, wherein:
the interaction request comprises a selection of a particular node in the view tree for expansion; and
the method comprises:
accessing the cache tree; and
if relevant data for expanding the selected particular node of the view tree is stored in the cache tree:
updating the view tree from the cache tree with the relevant data; and
displaying the updated view tree such that the selected particular node is expanded to include one or more child nodes.

8. The method of claim 1, wherein:
the interaction request comprises a request to display computing environment data associated with the particular computing environment; and
the method comprises:
retrieving computing environment data for the particular computing environment that is responsive to the request; and
applying the appropriate plug-in to display, in a panel of the unified user interface provided by the framework user interface, the retrieved computing environment data for the particular computing environment.

9. The method of claim 1, wherein:
the interaction request comprises a request to perform a command with respect to the particular computing environment; and
the method comprises:
accessing the appropriate plug-in; and
issuing the command to the particular computing environment.

10. The method of claim 9, further comprising:
determining a connection type for connecting to the particular computing environment; and
issuing the command to the particular computing environment via a link of the determined connection type.

11. The method of claim 9, comprising displaying, in a portion of the unified user interface provided by the framework user interface, output of the command according to the appropriate plug-in.

12. The method of claim 1, wherein the standard layout of the framework user interface comprises:

a first panel operable to display the listing of computing environments and computing environment components;
a second panel operable to display computing environment data specific to the particular computing environment according to the appropriate plug-in; and
a third panel operable to display output after command execution.

13. The method of claim 1, wherein the plurality of heterogeneous computing environments comprises one or more of the following:
a virtual environment;
a dynamic environment; and
a cluster environment.

14. The method of claim 1, wherein the plurality of computing environments comprises at least two computing environments of the same type but from different vendors.

15. The method of claim 1, wherein the unified user interface comprises a graphical user interface.

16. The method of claim 1, wherein the subset of the plurality of computing environments comprises all of the plurality of computing environments.

17. A system for providing a unified user interface for managing a plurality of heterogeneous computing environments, the system comprising one or more memory units and one or more processing units, the one or more processing units operable to:
display at least a portion of a framework user interface, the framework user interface comprising common functionality and a standard layout for a unified user interface for managing a plurality of heterogeneous computing environments;
display a listing of a subset of the plurality of heterogeneous computing environments, each of the plurality of heterogeneous computing environments being modeled by one or more objects, each object corresponding to a particular computing environment; and
in response to an interaction request with respect to a particular computing environment, apply an appropriate plug-in, based on a mapping of the object that corresponds to the particular computing environment to the appropriate plug-in, to perform the requested interaction, each plug-in corresponding to a type of computing environment and operable to facilitate display of information for managing a computing environment of the type corresponding to the plug-in.

18. The system of claim 17, wherein the one or more processing units are operable to map the objects that model the plurality of computing environments to appropriate plug-ins by:
accessing the objects that model the plurality of computing environments; and
for each of the accessed objects:
determining whether a plug-in exists that corresponds to the type of the computing environment corresponding to the object; and
mapping, if it is determined that a plug-in exists that corresponds to the type of the computing environment corresponding to the object, the object to the plug-in that corresponds to the type of the computing environment that corresponds to the object.

19. The system of claim 17, wherein the one or more processing units are operable to determine the appropriate plug-in to apply according to a key associated with particular computing environment in the listing of computing environments that is mapped to the particular computing environment, the key mapping the object corresponding to the particular computing environment to the appropriate plug-in.

20. The system of claim 17, wherein the one or more processing units are operable to generate a cache tree representation of at least a portion of the objects, the cache tree comprising a plurality of nodes, each node of the cache tree being associated with an object that models at least a portion of the computing environment that corresponds to the object.

21. The system of claim 20, wherein:
the objects that model the plurality of computing environment are arranged according to a business process view of the plurality of computing environments; and
the nodes of the cache tree are arranged according to the business process view arrangement of the objects.

22. The system of claim 20, wherein the one or more processing units are operable to:
generate a view tree from the cache tree, the view tree comprising at least a portion of the nodes of the cache tree, each node associated with a corresponding computing environment and a key mapping the node to its corresponding plug-in; and
display the view tree, the listing of the subset of computing environments comprising the view tree.

23. The system of claim 22, wherein:
the interaction request comprises a selection of a particular node in the view tree for expansion; and
the one or more processing units are operable to:
access the cache tree; and
if relevant data for expanding the selected particular node of the view tree is stored in the cache tree:
update the view tree from the cache tree with the relevant data; and
display the updated view tree such that the selected particular node is expanded to include one or more child nodes.

24. The system of claim 17, wherein:
the interaction request comprises a request to display computing environment data associated with the particular computing environment; and
the one or more processing units are operable to:
retrieve computing environment data for the particular computing environment that is responsive to the request; and
apply the appropriate plug-in to display, in a panel of the unified user interface provided by the framework user interface, the retrieved computing environment data for the particular computing environment.

25. The system of claim 17, wherein:
the interaction request comprises a request to perform a command with respect to the particular computing environment; and
the one or more processing units are operable to:
access the appropriate plug-in; and
issue the command to the particular computing environment.

26. The system of claim 25, wherein the one or more processing units are further operable to:
determine a connection type for connecting to the particular computing environment; and
issue the command to the particular computing environment via a link of the determined connection type.

27. The system of claim 25, wherein the one or more processing units are operable to display, in a portion of the unified user interface provided by the framework user interface, output of the command according to the appropriate plug-in.

28. The system of claim 17, wherein the standard layout of the framework user interface comprises:
a first panel operable to display the listing of computing environments and computing environment components;
a second panel operable to display computing environment data specific to the particular computing environment according to the appropriate plug-in; and
a third panel operable to display output after command execution.

29. The system of claim 17, wherein the plurality of heterogeneous computing environments comprises one or more of the following:
a virtual environment;
a dynamic environment; and
a cluster environment.

30. The system of claim 17, wherein the plurality of computing environments comprises at least two computing environments of the same type but from different vendors.

31. The system of claim 17, wherein the unified user interface comprises a graphical user interface.

32. The system of claim 17, wherein the subset of the plurality of computing environments comprises all of the plurality of computing environments.

33. Software for providing a unified user interface for managing a plurality of heterogeneous computing environments, the software being embodied in a computer-readable medium and when executed operable to:
display at least a portion of a framework user interface, the framework user interface comprising common functionality and a standard layout for a unified user interface for managing a plurality of heterogeneous computing environments;
display a listing of a subset of the plurality of heterogeneous computing environments, each of the plurality of heterogeneous computing environments being modeled by one or more objects, each object corresponding to a particular computing environment; and
in response to an interaction request with respect to a particular computing environment, apply an appropriate plug-in, based on a mapping of the object that corresponds to the particular computing environment to the appropriate plug-in, to perform the requested interaction, each plug-in corresponding to a type of computing environment and operable to facilitate display of information for managing a computing environment of the type corresponding to the plug-in.

34. The software of claim 33, operable to map the objects that model the plurality of computing environments to appropriate plug-ins by:
accessing the objects that model the plurality of computing environments; and
for each of the accessed objects:
determining whether a plug-in exists that corresponds to the type of the computing environment corresponding to the object; and
mapping, if it is determined that a plug-in exists that corresponds to the type of the computing environment corresponding to the object, the object to the plug-in that corresponds to the type of the computing environment that corresponds to the object.

35. The software of claim 33, operable to determine the appropriate plug-in to apply according to a key associated with particular computing environment in the listing of computing environments that is mapped to the particular computing environment, the key mapping the object corresponding to the particular computing environment to the appropriate plug-in.

36. The software of claim 33, operable to generate a cache tree representation of at least a portion of the objects, the cache tree comprising a plurality of nodes, each node of the cache tree being associated with an object that models at least a portion of the computing environment that corresponds to the object.

37. The software of claim 36, wherein:
the objects that model the plurality of computing environment are arranged according to a business process view of the plurality of computing environments; and
the nodes of the cache tree are arranged according to the business process view arrangement of the objects.

38. The software of claim 36, operable to:
generate a view tree from the cache tree, the view tree comprising at least a portion of the nodes of the cache tree, each node associated with a corresponding computing environment and a key mapping the node to its corresponding plug-in; and
display the view tree, the listing of the subset of computing environments comprising the view tree.

39. The software of claim 38, wherein:
the interaction request comprises a selection of a particular node in the view tree for expansion; and
the software is operable to:
access the cache tree; and
if relevant data for expanding the selected particular node of the view tree is stored in the cache tree:
update the view tree from the cache tree with the relevant data; and
display the updated view tree such that the selected particular node is expanded to include one or more child nodes.

40. The software of claim 33, wherein:
the interaction request comprises a request to display computing environment data associated with the particular computing environment; and
the software is operable to:
retrieve computing environment data for the particular computing environment that is responsive to the request; and
apply the appropriate plug-in to display, in a panel of the unified user interface provided by the framework user interface, the retrieved computing environment data for the particular computing environment.

41. The software of claim 33, wherein:
the interaction request comprises a request to perform a command with respect to the particular computing environment; and
the software is operable to:
access the appropriate plug-in; and
issue the command to the particular computing environment.

42. The software of claim 41, further operable to:
determine a connection type for connecting to the particular computing environment; and
issue the command to the particular computing environment via a link of the determined connection type.

43. The software of claim 41, comprising displaying, in a portion of the unified user interface provided by the framework user interface, output of the command according to the appropriate plug-in.

44. The software of claim 33, wherein the standard layout of the framework user interface comprises:
a first panel operable to display the listing of computing environments and computing environment components;
a second panel operable to display computing environment data specific to the particular computing environment according to the appropriate plug-in; and
a third panel operable to display output after command execution.

45. The software of claim 33, wherein the plurality of heterogeneous computing environments comprises one or more of the following:
a virtual environment;
a dynamic environment; and
a cluster environment.

46. The software of claim 33, wherein the plurality of computing environments comprises at least two computing environments of the same type but from different vendors.

47. The software of claim 33, wherein the unified user interface comprises a graphical user interface.

48. The software of claim 33, wherein the subset of the plurality of computing environments comprises all of the plurality of computing environments.

49. A method for providing a unified user interface for managing a plurality of heterogeneous computing environments, the method comprising:
providing a framework user interface, the framework user interface comprising common functionality and a standard layout for a unified user interface for managing the plurality of heterogeneous computing environments;
providing a plurality of plug-ins, each plug-in corresponding to a type of computer environment in the plurality of heterogeneous computing environments, each computing environment being modeled by one or more corresponding objects, each plug-in operable to facilitate display of information associated with a computing environment of its corresponding type through a mapping of the plug-in to one or more objects that model the computing environment; and
generating the unified user interface according to the framework user interface and one or more of the plug-ins, the unified user interface for managing the plurality of heterogeneous computing environments.

* * * * *